(12) United States Patent
Yamamoto et al.

(10) Patent No.: US 11,777,141 B2
(45) Date of Patent: Oct. 3, 2023

(54) ELECTROLYTE PRECURSOR SOLUTION, ELECTRODE ASSEMBLY, BATTERY, AND ELECTRONIC APPARATUS

(71) Applicant: SEIKO EPSON CORPORATION, Tokyo (JP)

(72) Inventors: Hitoshi Yamamoto, Chino (JP); Tomofumi Yokoyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 119 days.

(21) Appl. No.: 17/221,296

(22) Filed: Apr. 2, 2021

(65) Prior Publication Data

US 2021/0226248 A1 Jul. 22, 2021

Related U.S. Application Data

(62) Division of application No. 16/228,873, filed on Dec. 21, 2018, now Pat. No. 10,998,576.

(30) Foreign Application Priority Data

Dec. 22, 2017 (JP) ................. 2017-245964

(51) Int. Cl.
*H01M 10/0562* (2010.01)
*H01M 10/0525* (2010.01)
*H01M 10/0569* (2010.01)
*H01M 10/02* (2006.01)
*H01M 10/0567* (2010.01)

(52) U.S. Cl.
CPC ....... *H01M 10/0562* (2013.01); *H01M 10/02* (2013.01); *H01M 10/0525* (2013.01); *H01M 10/0567* (2013.01); *H01M 10/0569* (2013.01); *H01M 2300/0091* (2013.01)

(58) Field of Classification Search
None
See application file for complete search history.

(56) References Cited

U.S. PATENT DOCUMENTS

| | | | |
|---|---|---|---|
| 2011/0059369 A1 | 3/2011 | Nan et al. | |
| 2012/0237834 A1 | 9/2012 | Ogasa | |
| 2013/0037411 A1* | 2/2013 | Atobe | H01G 9/028 |
| | | | 205/50 |
| 2014/0295293 A1 | 10/2014 | Nikawa et al. | |

(Continued)

FOREIGN PATENT DOCUMENTS

| | | |
|---|---|---|
| JP | H05-325990 A | 12/1993 |
| JP | 2001-223139 A | 8/2001 |

(Continued)

*Primary Examiner* — Wyatt P McConnell
(74) *Attorney, Agent, or Firm* — Oliff PLC

(57) ABSTRACT

An electrolyte precursor solution includes a metallic compound containing elements constituting an electrolyte, a solvent capable of dissolving the metallic compound, and an anionic surfactant having a sulfate group ($SO_4^{2-}$) bonded to a hydrophobic group R. By reacting such an electrolyte precursor solution with active material particles containing lithium, lithium sulfate derived from the anionic surfactant is interposed at the interface between the surface of the active material particle and the electrolyte so as to enhance the dissociation of lithium ions at the interface, and thus, an excellent ion conductivity can be realized.

1 Claim, 8 Drawing Sheets

(56) References Cited

U.S. PATENT DOCUMENTS

2015/0056519 A1 2/2015 Ohta et al.
2016/0204448 A1 7/2016 Kim et al.

FOREIGN PATENT DOCUMENTS

| JP | 2003-346895 A | 12/2003 |
| JP | 2005-050778 A | 2/2005 |
| JP | 2009-215130 A | 9/2009 |
| JP | 2011-108388 A | 6/2011 |
| JP | 2011-529243 A | 12/2011 |
| JP | 2016-072071 A | 5/2016 |
| JP | 2016-532007 A | 10/2016 |

\* cited by examiner

ELECTROLYTE PRECURSOR SOLUTION, ELECTRODE ASSEMBLY, BATTERY, AND ELECTRONIC APPARATUS This application is a Divisional of application Ser. No. 16/228,873, filed Dec. 21, 2018, which claims priority to Japanese Application No. 2017-245964, filed Dec. 22, 2017. The entire contents of the prior applications are hereby incorporated by reference herein in their entirety.

BACKGROUND

1. Technical Field

The present invention relates to an electrolyte precursor solution, an electrode assembly, a battery using the electrode assembly, and an electronic apparatus including the battery.

2. Related Art

As a power supply for many electronic apparatuses such as portable information apparatuses, a lithium battery (including a primary battery and a secondary battery) has been used. In the lithium battery, a liquid electrolyte is adopted because a high ion conductivity is obtained, however, an advanced technique is required for safely sealing the liquid electrolyte between the positive electrode and the negative electrode so as to prevent the leakage of the electrolyte. Therefore, a solid electrolyte capable of achieving both a high energy density and safety has been attracting attention.

As such a solid electrolyte, for example, JP-T-2011-529243 (Patent Document 1) discloses a silicon-containing lithium lanthanum titanate composite solid electrolyte material, in which amorphous Si or an amorphous Si compound exists at a grain boundary between crystal grains of lithium lanthanum titanate represented by the chemical formula: $Li_{3-x}La_{2/3-x}TiO_3$ (0<x<0.16).

Further, in Patent Document 1, a method in which a raw material solution of lithium lanthanum titanate and a silicon precursor solution are mixed and reacted with each other by heating, followed by drying, thereby obtaining a composite powder, and the composite powder is pressed into the form of a sheet and then sintered at a high temperature between 1100° C. and 1400° C. for 1 hour to 10 hours, whereby a composite solid electrolyte material is obtained is described as a method for producing a silicon-containing lithium lanthanum titanate composite solid electrolyte material. According to the composite solid electrolyte material obtained in this manner, the grain boundary electrical conductivity is significantly improved by existence of amorphous Si or an amorphous Si compound at a grain boundary between crystal grains of lithium lanthanum titanate.

However, in the above-mentioned method for producing a silicon-containing lithium lanthanum titanate composite solid electrolyte material of Patent Document 1, as described above, sintering is performed at a high temperature between 1100° C. and 1400° C., and therefore, there is a fear that lithium is evaporated and released from the composite powder during sintering, or a byproduct is generated, and a composite solid electrolyte material having a desired composition may not be obtained. Therefore, when the sintering temperature is set to, for example, lower than 1000° C. for suppressing the release of lithium or the generation of a byproduct, sintering is not sufficient at the interface between the crystal grains of lithium lanthanum titanate, and there is a problem that the grain boundary resistance increases and the ion conductivity decreases.

SUMMARY

An advantage of some aspects of the invention is to solve at least part of the above-mentioned problems and the invention can be implemented as the following forms or application examples.

Application Example

An electrolyte precursor solution according to this application example includes a metallic compound containing elements constituting an electrolyte, a solvent capable of dissolving the metallic compound, and an anionic surfactant having a sulfate group.

According to the electrolyte precursor solution of this application example, an anionic surfactant having a sulfate group is contained, and therefore, when active material particles to be used as an electrode material of a battery and the electrolyte precursor solution are brought into contact with each other and reacted with each other, a sulfate group which is a hydrophilic group is bonded to the surface of the active material particle. Therefore, by existence of a sulfate group between the active material particle and the electrolyte (metallic compound), the active material is easily dissociated as an ion, and thus, the ion conductivity between the active material particle and the electrolyte can be improved. That is, an electrolyte precursor solution capable of forming an electrolyte having a high ion conductivity can be provided.

In the electrolyte precursor solution according to the above-mentioned application example, it is preferred that the anionic surfactant is contained at a concentration 5 times or more and 15 times or less the critical micelle concentration in the solvent.

According to this configuration, a sulfate group is reliably made to exist between the active material particle and the electrolyte, and thus, the ion conductivity can be improved.

In the electrolyte precursor solution according to the above-mentioned application example, it is preferred that the anionic surfactant contains lithium.

According to this configuration, the anionic surfactant contains lithium, and therefore, the amount of lithium as the active material is increased, and thus, the lithium ion conductivity can be further improved.

In the electrolyte precursor solution according to the above-mentioned application example, it is preferred that the anionic surfactant contains a hydrophobic group having 4 or more carbon atoms or a fluorinated alkyl group to which a sulfate group and lithium are bonded.

According to this configuration, when the anionic surfactant contains a hydrophobic group having 4 or more carbon atoms or a fluorinated alkyl group, it exhibits hydrophobicity, and therefore shows a function as a surfactant, and by aligning this anionic surfactant such that the sulfate group faces the surface of the active material particle, the wettability of the electrolyte precursor solution exhibiting hydrophobicity can be improved.

Application Example

A method for producing an electrode assembly according to this application example includes a step of forming an active material portion having voids inside using active material particles, impregnating the active material portion with the electrolyte precursor solution according to the above-mentioned application example, followed by drying, and firing the active material portion impregnated with the electrolyte precursor solution at a lower temperature than the melting point of the active material particles.

According to this application example, an electrode assembly whose ion conductivity is improved by combining an active material portion composed of active material particles with an electrolyte and interposing a sulfate group of an anionic surfactant between the surface of the active material particle and the electrolyte in the voids of the active material portion can be produced. Therefore, even if the temperature during firing is set lower than the melting point of the active material particle, a desired ion conductivity can be ensured, and also in the case where the active material is lithium, by performing firing at a low temperature, the release of lithium or the generation of a byproduct during firing is suppressed, and thus, an electrode assembly having a desired composition can be produced.

In the method for producing an electrode assembly according to the above-mentioned application example, it is preferred that the impregnating of the active material portion with the electrolyte precursor solution, followed by drying is repeatedly performed.

According to this method, the filling ratio of the electrolyte to the voids of the active material portion is improved to decrease the internal resistance, and therefore, an electrode assembly having an improved capacitance per unit volume, that is, an improved energy density can be produced.

In the method for producing an electrode assembly according to the above-mentioned application example, it is preferred that the metallic compound of the electrolyte precursor solution contains elements constituting a crystalline first electrolyte portion and an amorphous second electrolyte portion after firing.

According to this method, an electrolyte obtained after firing includes a crystalline first electrolyte portion in which the direction of ion conduction is restricted and an amorphous second electrolyte portion in which the direction of ion conduction is hardly restricted, and therefore, a higher ion conductivity can be realized as compared with the case where only a crystalline first electrolyte portion is included.

In the method for producing an electrode assembly according to the above-mentioned application example, it is preferred that the method further includes melting a third electrolyte which has a lower melting point than the first electrolyte portion and the second electrolyte portion and constitutes an amorphous third electrolyte portion after cooling, and impregnating the active material portion with the third electrolyte, followed by cooling.

According to this method, a third electrolyte portion is further formed in the voids of the active material portion, and therefore, an ion conduction pathway (ion conduction path) between the active material particle and the electrolyte is further increased, and thus, a higher ion conductivity can be realized.

Application Example

An electrode assembly according to this application example includes an active material portion including a plurality of active material particles and having voids inside, and an electrolyte including a crystalline first electrolyte portion and an amorphous second electrolyte portion, wherein each of the active material particle, the first electrolyte portion, and the second electrolyte portion contains lithium, the electrolyte is contained in the voids of the active material portion, and lithium sulfate is interposed between the surface of the active material particle and the electrolyte in the voids.

According to this application example, the electrolyte includes a crystalline first electrolyte portion and an amorphous second electrolyte portion, and therefore, as compared with the case where the electrolyte is constituted by only a crystalline first electrolyte portion, the conduction (transfer) of lithium ions between the first electrolyte portion and the second electrolyte portion is efficiently performed. In addition, since the electrolyte is contained in the voids of the active material portion and lithium sulfate is interposed between the surface of the active material particle and the electrolyte in the voids, the dissociation of lithium ions on the surface of the active material particle is enhanced. That is, due to the improvement of the concentration of lithium ions between the active material particle and the electrolyte in addition to the improvement of the ion conductivity between the first electrolyte portion and the second electrolyte portion, an electrode assembly having an improved ion conductivity can be provided.

In the electrode assembly according to the above-mentioned application example, it is preferred that the first electrolyte portion is a metallic compound represented by the following formula (1) having a garnet-type crystal structure, and contains a metal A having a crystal radius of 78 pm or more, and the metal A is contained in the first electrolyte portion and the second electrolyte portion.

$$Li_{7-x}La_3(Zr_{2-x}A_x)O_{12} \qquad (1)$$

In the formula (1), x satisfies the following formula: $0.05 \leq x \leq 0.6$, and as the metal A, at least one metal is selected from Nb, Ta, and Sb.

According to this configuration, the metal A having a crystal radius of 78 pm or more is partially substituted for the Zr site of the first electrolyte portion, and therefore, a concentration gradient associated with the metal A is generated between the first electrolyte portion and the second electrolyte portion. That is, at an interface where the first electrolyte portion and the second electrolyte portion are in contact with each other, the interface is hardly clear due to the concentration gradient of the metal A. That is, lithium ion conduction between the first electrolyte portion and the second electrolyte portion becomes easy, and thus, an electrode assembly in which an active material portion and an electrolyte having a high ion conductivity are combined can be provided.

In the electrode assembly according to the above-mentioned application example, it is preferred that the electrolyte includes an amorphous third electrolyte portion having a lower melting point than the first electrolyte portion and the second electrolyte portion.

According to this configuration, the electrolyte including the third electrolyte portion in addition to the first electrolyte portion and the second electrolyte portion is contained in the voids of the active material portion, and therefore, ion conduction paths are increased, and thus, an electrode assembly having a further improved ion conductivity can be realized. In addition, the third electrolyte portion has a lower melting point than the first electrolyte portion and the second electrolyte portion, and therefore, an electrolyte material constituting the third electrolyte portion can be melted and filled in the voids of the active material portion. That is, the composition of the first electrolyte portion or the second electrolyte portion can be prevented from changing due to heat when filling the third electrolyte portion in the active material portion.

Application Example

A battery according to this application example includes the electrode assembly according to the above-mentioned application example, a current collector provided so as to come into contact with the active material particles on one face side of the electrode assembly, and a negative electrode provided on the other face side of the electrode assembly.

According to this application example, the electrode assembly is configured such that the active material portion and the electrolyte are combined and therefore has a high energy density and a high ion conductivity, and thus, a battery having an excellent charge-discharge characteristic and a high capacity can be provided.

In the battery according to the above-mentioned application example, it is preferred that the negative electrode is composed of metallic lithium or an alloy containing lithium, and a lithium reduction resistant layer is provided between the other face of the electrode assembly and the negative electrode.

According to this configuration, the negative electrode is constituted by metallic lithium or an alloy containing lithium, and therefore, as compared with the case where the negative electrode is constituted by another active material, a lithium supply source is increased, and thus, a battery having a high capacity can be realized. Further, a lithium reduction resistant layer is provided between the other face of the electrode assembly and the negative electrode, and therefore, the growth of lithium dendrites on the negative electrode side due to charge and discharge can be prevented by the lithium reduction resistant layer. That is, a short circuit between the electrode assembly which functions as the positive electrode and the negative electrode caused by the growth of lithium dendrites can be prevented.

Application Example

An electronic apparatus according to this application example includes the battery according to the above-mentioned application example.

According to this application example, the battery which has an excellent charge-discharge characteristic and a high capacity is included, and therefore, an electronic apparatus which can withstand long-term repeated use can be provided.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments embodying the invention will be described with reference to the drawings. Note that the drawings to be used are displayed by being appropriately enlarged or reduced in size so that portions to be described are in a recognizable state.

First Embodiment

Battery

Figure 1:
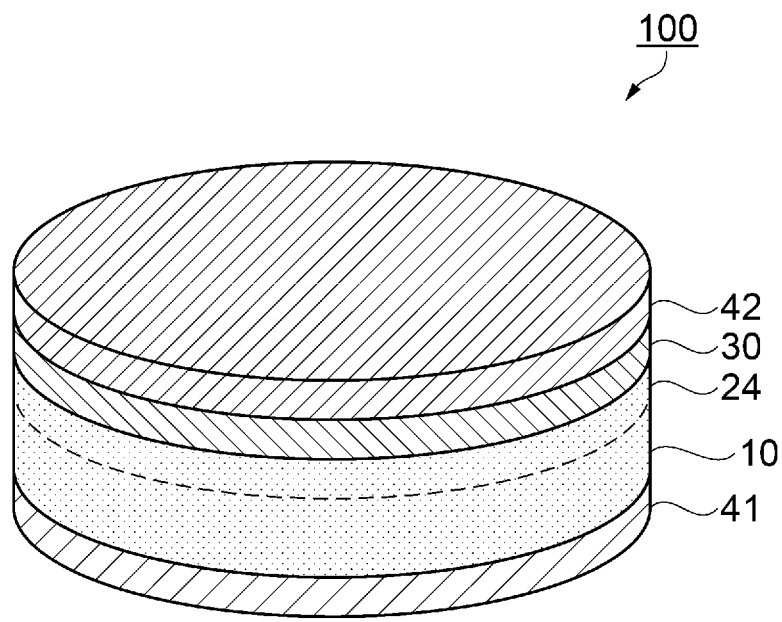
FIG. 1 is a schematic perspective view showing a structure of a lithium battery of a first embodiment.

First, a battery of this embodiment will be described with reference to FIGS. 1 to 3 by showing a lithium battery as an example. FIG. 1 is a schematic perspective view showing a structure of a lithium battery of a first embodiment, FIG. 2 is a schematic cross-sectional view showing a structure of the lithium battery of the first embodiment, and FIG. 3 is an enlarged view showing an active material portion, a first electrolyte portion, a second electrolyte portion, and a third electrolyte portion in an electrode assembly of the first embodiment.

As shown in FIG. 1, a lithium battery 100 of this embodiment includes an electrode assembly 10 which functions as a positive electrode, and an electrolyte layer 24 and a negative electrode 30 which are sequentially stacked on the electrode assembly 10. The lithium battery 100 further includes a current collector 41 which comes into contact with the electrode assembly 10, and a current collector 42 which comes into contact with the negative electrode 30. Each of the electrode assembly 10, the electrolyte layer 24, and the negative electrode 30 is constituted by a solid phase containing lithium, and therefore, the lithium battery 100 is a solid secondary battery which can be charged and discharged.

The lithium battery 100 of this embodiment has, for example, a circular disk shape, and the contour size is, for example, φ10 mm and the thickness is, for example, about 0.3 mm. The lithium battery 100 is small and thin and also is a solid secondary battery which can be charged and discharged, and therefore can be favorably used as a power supply for a portable information terminal such as a smartphone. The size or the thickness of the lithium battery 100 is not limited to this value as long as molding can be performed. In the case where the contour size is φ10 mm as in this embodiment, the thickness is estimated to be about 0.1 mm when it is thin from the viewpoint of shapability, and it is estimated to be about up to 1 mm when it is thick from the viewpoint of the lithium ion conduction property of the electrolyte, and if it is too thick, the utilization efficiency of the active material is deteriorated. The shape of the lithium battery 100 is not limited to a circular disk shape and may be a polygonal disk shape. Hereinafter, the respective layers will be described in detail.

Figure 2:
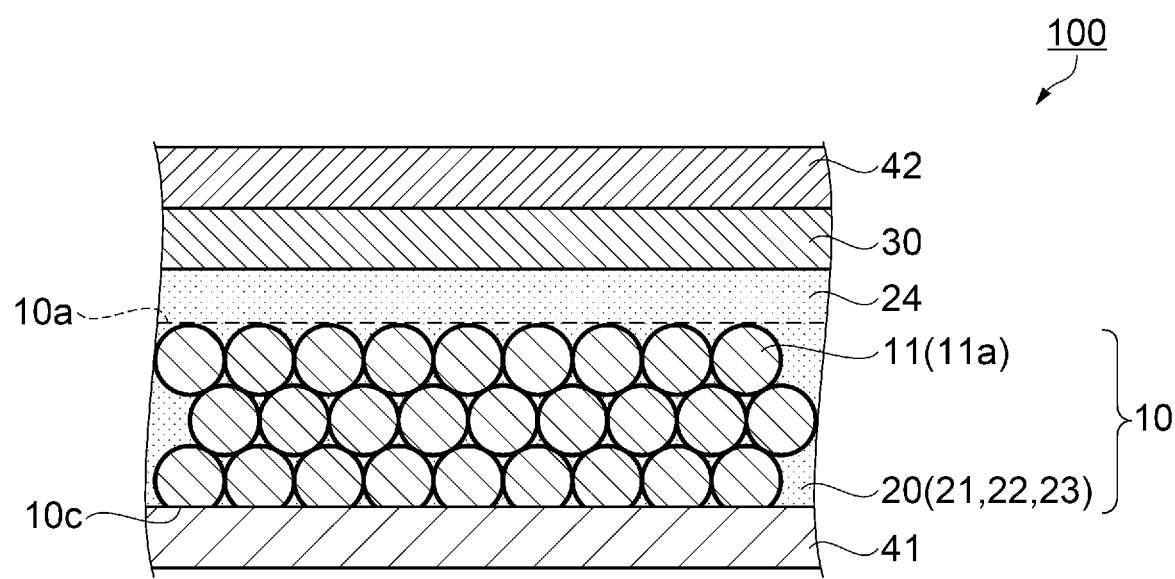
FIG. 2 is a schematic cross-sectional view showing a structure of the lithium battery of the first embodiment.
Figure 3:
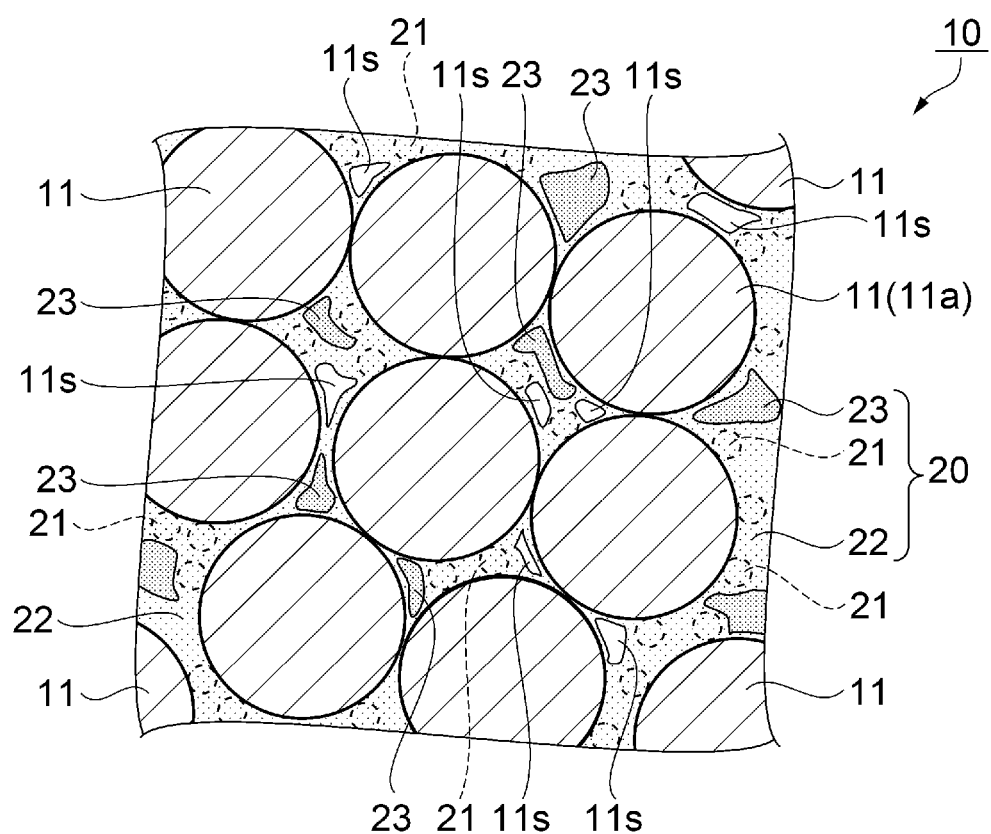
FIG. 3 is an enlarged view showing an active material portion, a first electrolyte portion, a second electrolyte portion, and a third electrolyte portion in an electrode assembly of the first embodiment.

As shown in FIG. 2, the electrode assembly 10 which functions as a positive electrode includes an active material portion 11 composed of a plurality of active material particles 11a and an electrolyte 20. A detailed description of the structure of the electrode assembly 10 and the production method thereof will be given later, however, by including the active material portion 11 formed by sintering in a state where the active material particles 11a are in contact with one another in the electrode assembly 10, the electrode assembly 10 is in a state where an electron conduction property is imparted. Further, the current collector 41 is provided so as to come into contact with the plurality of active material particles 11a. The electrolyte 20 includes a crystalline first electrolyte portion 21, an amorphous second electrolyte portion 22, and also an amorphous third electrolyte portion 23. As the crystalline first electrolyte portion 21 and the amorphous second electrolyte portion 22, materials having a higher ion conductivity than the third electrolyte portion 23 are selected and used.

As the amorphous third electrolyte portion 23, a material having a lower melting point than the materials constituting the active material particles 11a, the first electrolyte portion 21, and the second electrolyte portion 22 is selected and used.

The electrolyte layer 24 provided between the electrode assembly 10 and the negative electrode 30 is constituted using an ion conductive electrolyte without containing the active material particles 11a. Such an electrolyte layer 24 suppresses generation of lithium dendrites on the negative electrode 30 side due to charge and discharge of the lithium battery 100, and functions as a lithium reduction resistant layer which prevents an electrical short circuit between the electrode assembly 10 to which an electron conduction property is imparted and the negative electrode 30 due to lithium dendrites.

Hereinafter, a description will be given by referring to a face of the electrode assembly 10 which comes into contact with the current collector 41 as □one face 10c□ and a face of the electrode assembly 10 which comes into contact with the electrolyte layer 24 as □the other face 10a□ in the lithium battery 100 of this embodiment.

Electrode Assembly

FIG. 3 is a view schematically showing a state where a sample obtained by slicing the electrode assembly 10 thin is observed with a transmission electron microscope (TEM). As shown in FIG. 3, the electrode assembly 10 includes the plurality of active material particles 11a constituting the active material portion 11, and the electrolyte 20 is filled between the particles of the active material particles 11a. Each of the active material particle 11a and the first electrolyte portion 21 of the electrolyte 20 is in the form of a particle, and the particle diameter of the first electrolyte portion 21 is much smaller than the particle diameter of the active material particle 11a. The first electrolyte portion 21 exists between the particles of the active material particles 11a while being in contact with the surface of the active material particle 11a. Further, the amorphous second electrolyte portion 22 and the amorphous third electrolyte portion 23 exist so as to fill the gap between the particles of the active material particles 11a and come into contact with the active material particle 11a and the first electrolyte portion 21. It is preferred that all the gaps between the particles of the active material particles 11a are filled with the electrolyte 20, however, in fact, some gaps are in a state of including a space 11s.

The interface between the active material particle 11a and the electrolyte 20, the interface of the third electrolyte portion 23 in the electrolyte 20, and the interface of the space 11s between the particles of the active material particles 11a are clear, however, the interface between the first electrolyte portion 21 and the second electrolyte portion 22 in the electrolyte 20 is not clear. In FIG. 3, for convenience of illustration, the shape of the particle of each of the active material particle 11a and the first electrolyte portion 21 is shown in a spherical shape, however, the actual shape of the particle is not necessarily a spherical shape, but is an indefinite shape.

From the viewpoint that an electron conduction property is exhibited by bringing the particles of the active material particles 11a into contact with one another, as for the particle diameter of the active material particle 11a, for example, the average particle diameter D50 thereof is preferably set to 500 nm or more and less than 10 μm. On the other hand, as for the particle diameter of the first electrolyte portion 21, for example, the average particle diameter D50 thereof is at a submicron level in relation to the below-mentioned production method. In FIG. 3, the particles of the first electrolyte portion 21 are illustrated in a recognizable state, however, in fact, fine particles at a submicron level come into contact with one another and form the first electrolyte portion 21.

As the active material particle 11a which is a positive electrode active material constituting the active material portion 11, it is preferred to use a lithium composite metal oxide which contains at least Li, and further contains at least one type of transition metal selected from V, Cr, Mn, Fe, Co, Ni, and Cu as the constituent element because it is chemically stable. Examples of such a lithium composite metal oxide include $LiCoO_2$, $LiNiO_2$, $LiMn_2O_4$, $Li_2Mn_2O_3$, $Li(Ni_xMn_yCo_{1-x-y})O_2$ [$0<x+y<1$], $Li(Ni_xCo_yAl_{1-x-y})O_2$ [$0<x+y<1$], $LiCr_{0.5}Mn_{0.5}O_2$, $LiFePO_4$, $Li_2FeP_2O_7$, $LiMnPO_4$, $LiFeBO_3$, $Li_3V_2(PO_4)_3$, $Li_2CuO_2$, $Li_2FeSiO_4$, and $Li_2MnSiO_4$. Further, solid solutions in which the atoms in a crystal of any of these lithium composite metal oxides are partially substituted with a typical metal, an alkali metal, an alkaline earth metal, a lanthanoid, a chalcogenide, a halogen, or the like are also included in the lithium composite metal oxide, and any of these solid solutions can also be used as the active material particle 11a. In this embodiment, as the active material particle 11a, a $LiCoO_2$ particle is used, and hereinafter, the $LiCoO_2$ particle is sometimes referred to as □LCO particle□ for short.

As a method for forming the active material portion 11 including the plurality of active material particles 11a, the active material portion 11 may be formed into a thin film using a press sintering method, a vapor phase deposition method such as CVD, PLD, sputtering, or aerosol deposition other than a green sheet method. Further, a single crystal grown from a melt or a solution may be used. In the case where a green sheet method or a press sintering method is used as the method for forming the active material portion 11, voids occur between the particles of the active material particles 11a after sintering. Such voids are in a state of communicating with one another inside the active material portion 11. When the voids are filled with the electrolyte 20, a contact area between the active material particle 11a and the electrolyte 20 increases, so that the interfacial impedance of the electrode assembly 10 can be decreased. In consideration of the interfacial impedance of the electrode assembly 10, the bulk density porosity in the active material portion 11 is preferably from 40% to 60%, and the filling ratio of the electrolyte 20 in the voids is preferably 80% or more. The bulk density porosity a is derived from the following formula (1) using the apparent volume v and the mass w of the active material portion 11 and the density ρ of the active material particle 11a.

$$a=\{1-w/(v\cdot\varphi)\}\times 100 \quad (1)$$

The filling ratio of the electrolyte 20 can be determined by dividing the value obtained by subtracting the mass before filling from the mass after filling by the density of the electrolyte 20.

The electrical resistivity of the active material portion 11 is preferably 700 Ω·cm or less. When the active material portion 11 has such an electrical resistivity, a sufficient output can be obtained in the lithium battery 100 using the electrode assembly 10. The electrical resistivity can be determined by adhering a copper foil to be used as an electrode to the surface of the active material portion 11, and performing DC polarization measurement.

Electrolyte

As the electrolyte 20 (the first electrolyte portion 21, the second electrolyte portion 22, and the third electrolyte portion 23) and the electrolyte layer 24 included in the electrode assembly 10, a crystalline or amorphous material which is a solid electrolyte and is composed of a metallic compound such as an oxide, a sulfide, a halide, a nitride, a hydride, or a boride can be used.

Example of the oxide crystalline material include $Li_{0.35}La_{0.55}TiO_3$, $Li_{0.2}La_{0.27}NbO_3$, and a perovskite-type crystal or a perovskite-like crystal in which the elements in a crystal thereof are partially substituted with N, F, Al, Sr, Sc, Nb, Ta, Sb, a lanthanoid element, or the like, $Li_7La_3Zr_2O_{12}$, $Li_5La_3Nb_2O_{12}$, $Li_5BaLa_2TaO_{12}$, and a garnet-type crystal or a garnet-like crystal in which the elements in a crystal thereof are partially substituted with N, F, Al, Sr, Sc, Nb, Ta, Sb, a lanthanoid element, or the like, $Li_{1.3}Ti_{1.7}Al_{0.3}(PO_4)_3$, $Li_{1.4}Al_{0.4}Ti_{1.6}(PO_4)_3$, $Li_{1.4}Al_{0.4}Ti_{1.4}Ge_{0.2}(PO_4)_3$, and a NASICON-type crystal in which the elements in a crystal thereof are partially substituted with N, F, Al, Sr, Sc, Nb, Ta, Sb, a lanthanoid element, or the like, a LISICON-type crystal such as $Li_{14}ZnGe_4O_{16}$, and other crystalline materials such as $Li_{3.4}V_{0.6}Si_{0.4}O_4$, $Li_{3.6}V_{0.4}Ge_{0.6}O_4$, and $Li_{2+x}C_{1-x}B_xO_3$.

Example of the sulfide crystalline material include $Li_{10}GeP_2S_{12}$, $Li_{9.6}P_3S_{12}$, $Li_{9.54}Si_{1.74}P_{1.44}S_{11.7}Cl_{0.3}$, and $Li_3PS_4$.

Examples of other amorphous materials include $Li_2O$—$TiO_2$, $La_2O_3$—$Li_2O$—$TiO_2$, $LiNbO_3$, $LiSO_4$, $Li_4SiO_4$, $Li_3PO_4$—$Li_4SiO_4$, $Li_4GeO_4$—$Li_3VO_4$, $Li_4SiO_4$—$Li_3VO_4$, $Li_4GeO_4$—$Zn_2GeO_2$, $Li_4SiO_4$—$LiMoO_4$, $Li_3PO_4$—$Li_4SiO_4$, $Li_4SiO_4$—$Li_4ZrO_4$, $SiO_2$—$P_2O_5$—$Li_2O$, $SiO_2$—$P_2O_5LiCl$, $Li_2O$—$LiCl$—$B_2O_3$, $LiAlCl_4$, $LiAlF_4$, $LiF$—$Al_2O_3$, $LiBr$—$Al_2O_3$, $Li_{2.88}PO_{3.73}N_{0.14}$, $Li_3N$—$LiCl$, $Li_6NBr_3$, $Li_2S$—$SiS_2$, and $Li_2S$—$SiS_2$—$P_2S_5$.

Among the above-mentioned solid electrolytes, as the solid electrolyte to be used for the first electrolyte portion 21, a garnet-type crystal or a garnet-like crystal, which has an excellent ion conductivity, and in which the elements in a crystal of $Li_7La_3Zr_2O_{12}$ are partially substituted with Al, Sr, Sc, Nb, Ta, Sb, a lanthanoid element, or the like is preferred. Specific examples thereof include a compound represented by the following formula (2).

$$Li_{7-x}La_3(Zr_{2-x}A_x)O_{12} \quad (2)$$

In the formula (2), x satisfies the following formula: 0.05≤x≤0.6, and the metal A has an atomic crystal radius of 78 pm or more, and at least one metal is selected from Nb, Ta, and Sb. Hereinafter, the lithium composite metal oxide represented by the above formula (2) is denoted for short by □LLZrAO□. For example, the total ion conductivity of LLZrNbO (x=0.3) is $1.6\times10^{-4}$ [S/cm] (the grain bulk ion conductivity is $6.2\times10^{-4}$ [S/cm], and the grain boundary ion conductivity is $2.2\times10^{-4}$ [S/cm]).

According to the below-mentioned method for producing the electrode assembly 10, the second electrolyte portion 22 is composed of an amorphous solid electrolyte containing the same metal A as that of the first electrolyte portion 21. Therefore, the metal A is partially substituted for the Zr site in the crystal as shown in the above formula (2) in the first electrolyte portion 21, and also is contained in the amorphous second electrolyte portion 22, and therefore, a concentration gradient associated with the metal A occurs between the first electrolyte portion 21 and the second electrolyte portion 22, and thus, the interface between the crystalline first electrolyte portion 21 and the amorphous second electrolyte portion 22 is hardly clear. Lithium ions conduct in the crystalline material by hopping conduction in the crystalline first electrolyte portion 21, and conduct in the amorphous second electrolyte portion 22 by ion diffusion. Therefore, by connecting the crystalline first electrolyte portions 21 through the amorphous second electrolyte portion 22, lithium ions conduct by ion diffusion between the crystalline first electrolyte portions 21, and therefore, as compared with the case where a grain boundary exists between the crystalline first electrolyte portions 21, the ion conductivity in the electrolyte 20 is improved.

As the third electrolyte portion 23, $Li_{2+x}C_{1-x}B_xO_3$ which is a lithium composite oxide containing carbon (C) and boron (B), and has high coverage for the surface of the active material portion 11 (porous active material sintered body) and the voids therein, and has a lower melting point than the above-mentioned active material particles 11a, the first electrolyte portion 21, and the second electrolyte portion 22, or an analogous substance thereof is particularly preferably used. Hereinafter, $Li_{2+x}C_{1-x}B_xO_3$ is denoted for short by □LCBO□.

Further, according to the below-mentioned method for producing the electrode assembly 10, lithium sulfate exists between the surface of the active material particle 11a and the electrolyte 20. Lithium sulfate is derived from the anionic surfactant contained in the electrolyte precursor solution to be used when forming the electrolyte 20. Lithium sulfate present between the surface of the active material particle 11a and the electrolyte 20 is as thin as a single molecular layer or so, and the illustration thereof is omitted in FIG. 3. By interposing lithium sulfate between the surface of the active material particle 11a and the electrolyte 20, the dissociation of lithium ions as an active material is enhanced.

As a method for forming the electrolyte layer 24 using the above-mentioned solid electrolyte, other than a solution process such as a so-called sol-gel method involving a hydrolysis reaction of an organometallic compound or the like or an organometallic thermal decomposition method, a CVD method using an appropriate metallic compound in an appropriate gas atmosphere, an ALD method, a green sheet method or a screen printing method using a slurry of solid electrolyte particles, an aerosol deposition method, a sputtering method using an appropriate target and an appropriate gas atmosphere, a PLD method, a flux method using a melt or a solution, or the like can be used. In this embodiment, as a method for forming the electrolyte layer 24, a sputtering method is used.

In this embodiment, the same solid electrolyte is used for the third electrolyte portion 23 included in the electrode assembly 10 and the electrolyte layer 24, however, different solid electrolytes may be used.

The electrode assembly 10 is subjected to a polishing treatment so that the plurality of active material particles 11a are exposed on the one face 10c which comes into contact with the current collector 41. By connecting the current collector 41 to the plurality of active material particles 11a exposed on the one face 10c, the electrical resistance between the electrode assembly 10 and the current collector 41 is decreased.

Negative Electrode

As a negative electrode active material which can be used as the negative electrode 30 include $Nb_2O_5$, $V_2O_5$, $TiO_2$, $In_2O_3$, ZnO, $SnO_2$, NiO, ITO (indium tin oxide), AZO (Al-doped zinc oxide), FTO (F-doped tin oxide), an anatase phase of $TiO_2$, lithium composite metal oxides such as $Li_4Ti_5O_{12}$ and $Li_2Ti_3O_7$, metals such as Li, Si, Sn, Si—Mn, Si—Co, Si—Ni, In, and Au and alloys containing such metals, a carbon material, a material obtained by intercalation of lithium ions between layers of a carbon material, and the like can be exemplified. In consideration of the discharge capacity of the lithium battery 100 which is small and thin, the negative electrode 30 is preferably metallic Li or a metal simple substance and an alloy which form a lithium alloy. The alloy is not particularly limited as long as it can occlude and release lithium, but is preferably an alloy containing any of metals or metalloid elements in groups 13 and 14 excluding carbon, more preferably a metal simple substance such as aluminum, silicon, or tin, or an alloy or a compound containing these atoms. These may be used alone or two or more types thereof may be used in any combination at any ratio. As the alloy, lithium alloys such as Li—Al, Li—Ni, Li—Si, Li—Sn, and Li—Sn—Ni, silicon alloys such as Si—Zn, tin alloys such as Sn—Mn, Sn—Co, Sn—Ni, Sn—Cu, and Sn—La, $Cu_2Sb$, $La_3Ni_2Sn_7$, and the like can be exemplified.

As a method for forming the negative electrode 30 using the above-mentioned negative electrode active material, other than a solution process such as a so-called sol-gel method involving a hydrolysis reaction of an organometallic compound or the like or an organometallic thermal decomposition method, any method such as a CVD method using an appropriate metallic compound in an appropriate gas atmosphere, an ALD method, a green sheet method or a screen printing method using a slurry of a solid negative electrode active material, an aerosol deposition method, a sputtering method using an appropriate target and an appropriate gas atmosphere, a PLD method, a vacuum deposition method, a plating method, or a thermal spraying method may be used.

Current Collector

As the current collectors 41 and 42, for example, one type of metal (metal simple substance) selected from the metal group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), an alloy composed of two or more types of metals selected from this metal group, or the like is used.

In this embodiment, as the current collectors 41 and 42, copper (Cu) is used. The thickness of each of the current collectors 41 and 42 is, for example, from 20 μm to 40 μm.

The lithium battery 100 does not necessarily include a pair of current collectors 41 and 42 and may include one of the current collectors 41 and 42. For example, in the case where a plurality of lithium batteries 100 are stacked so as to be electrically connected in series and used, a configuration in which the lithium battery 100 includes only the current collector 41 of the pair of current collectors 41 and 42 may be adopted.

Method for Producing Lithium Battery (Method for Producing Electrode Assembly)

Figure 4:
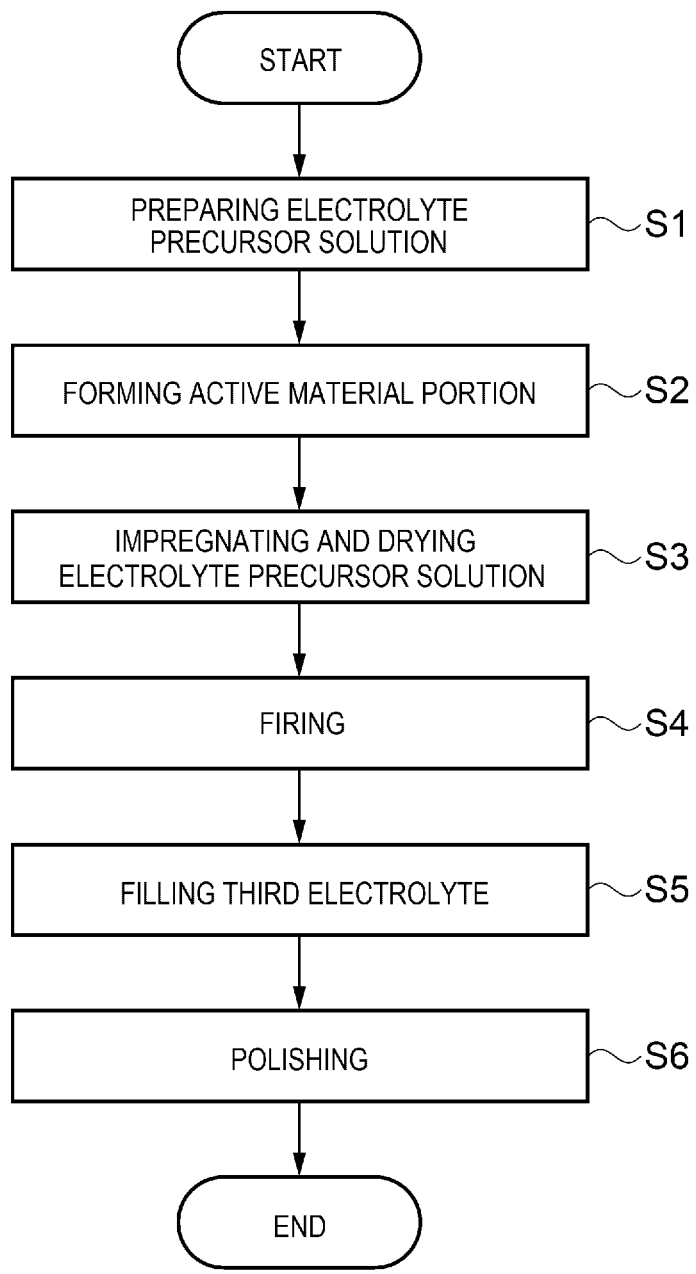
FIG. 4 is a flowchart showing a method for producing an electrode assembly in a lithium battery of the first embodiment.
Figure 5:
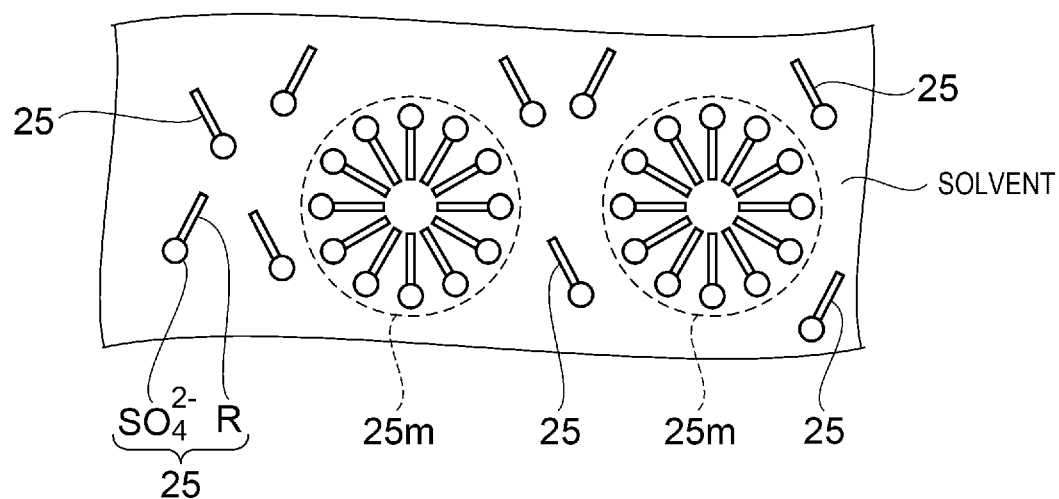
FIG. 5 is a schematic view showing a state of an anionic surfactant contained in an electrolyte precursor solution.

A method for producing the lithium battery 100 of this embodiment is characterized by a method for producing the electrode assembly 10. Therefore, the method for producing the electrode assembly 10 will be described with reference to FIGS. 4 to 10. FIG. 4 is a flowchart showing the method for producing the electrode assembly in the lithium battery of the first embodiment, and FIG. 5 is a schematic view showing a state of an anionic surfactant contained in an electrolyte precursor solution. FIGS. 6 to 10 are each a schematic view showing a step in the method for producing the electrode assembly.

As shown in FIG. 4, the method for producing the electrode assembly 10 of this embodiment includes a step of preparing an electrolyte precursor solution (step S1), a step of forming an active material portion 11 (step S2), a step of impregnating the active material portion 11 with the electrolyte precursor solution and performing drying (step S3), a firing step (step S4), a step of filling a third electrolyte (step S5), and a polishing step (step S6). Hereinafter, the respective steps will be described sequentially.

In the step S1, first, various metal elements contained in the first electrolyte portion 21 and the second electrolyte portion 22 are obtained as metallic compounds, respectively, and each metallic compound solution in which the metallic compound is dissolved in a solvent is prepared. The metallic compounds to serve as objects in this embodiment are a lithium compound, a lanthanum compound, a zirconium compound, a niobium compound, a tantalum compound, and an antimony compound.

Examples of the lithium compound (lithium source) include lithium metal salts such as lithium chloride, lithium nitrate, lithium acetate, lithium hydroxide, and lithium carbonate, and lithium alkoxides such as lithium methoxide, lithium ethoxide, lithium propoxide, lithium isopropoxide, lithium butoxide, lithium isobutoxide, lithium sec-butoxide, lithium tert-butoxide, and lithium dipivaloylmethanate, and among these, one type can be used or two or more types can be used in combination.

Examples of the lanthanum compound (lanthanum source) include lanthanum metal salts such as lanthanum chloride, lanthanum nitrate, and lanthanum acetate, and lanthanum alkoxides such as lanthanum trimethoxide, lanthanum triethoxide, lanthanum tripropoxide, lanthanum triisopropoxide, lanthanum tributoxide, lanthanum triisobutoxide, lanthanum tri-sec-butoxide, lanthanum tri-tert-butoxide, and lanthanum dipivaloylmethanate, and among these, one type can be used or two or more types can be used in combination.

Examples of the zirconium compound (zirconium source) include zirconium metal salts such as zirconium chloride, zirconium oxychloride, zirconium oxynitrate, zirconium oxyacetate, and zirconium acetate, and zirconium alkoxides such as zirconium tetramethoxide, zirconium tetraethoxide, zirconium tetrapropoxide, zirconium tetraisopropoxide, zirconium tetrabutoxide, zirconium tetraisobutoxide, zirconium tetra-sec-butoxide, zirconium tetra-tert-butoxide, and zirconium dipivaloylmethanate, and among these, one type can be used or two or more types can be used in combination.

Examples of the niobium compound (niobium source) as a compound having an atomic crystal radius of 78 pm or more include niobium metal salts such as niobium chloride, niobium oxychloride, niobium oxalate, and niobium pentaacetylacetonate, and niobium alkoxides such as niobium pentaethoxide, niobium pentapropoxide, niobium pentaisopropoxide, and niobium penta-sec-butoxide, and among these, one type can be used or two or more types can be used in combination.

Similarly, examples of the tantalum compound (tantalum source) as a compound having an atomic crystal radius of 78 pm or more include tantalum metal salts such as tantalum chloride and tantalum bromide, and tantalum alkoxides such as tantalum pentamethoxide, tantalum pentaethoxide, tantalum pentaisopropoxide, tantalum penta-n-propoxide, tantalum pentaisobutoxide, tantalum penta-n-butoxide, tantalum penta-sec-butoxide, and tantalum penta-tert-butoxide, and among these, one type can be used or two or more types can be used in combination.

Further, examples of the antimony compound (antimony source) as a compound having an atomic crystal radius of 78 pm or more include antimony metal salts such as antimony bromide, antimony chloride, and antimony fluoride, and antimony alkoxides such as antimony trimethoxide, antimony triethoxide, antimony triisopropoxide, antimony tri-n-propoxide, antimony triisobutoxide, and antimony tri-n-butoxide, and among these, one type can be used or two or more types can be used in combination.

As the solvent, a single solvent of water or an organic solvent or a mixed solvent thereof capable of dissolving each of a lithium compound, a lanthanum compound, a zirconium compound, and a metallic compound having an atomic crystal radius of 78 pm or more is used.

Such an organic solvent is not particularly limited, however, examples thereof include alcohols such as methanol, ethanol, n-propyl alcohol, isopropyl alcohol, allyl alcohol, and 2-n-butoxyethanol, glycols such as ethylene glycol, propylene glycol, butylene glycol, hexylene glycol, pentanediol, hexanediol, heptanediol, and dipropylene glycol, ketones such as acetone, methyl ethyl ketone, methyl propyl ketone, and methyl isobutyl ketone, esters such as methyl formate, ethyl formate, methyl acetate, and methyl acetoacetate, ethers such as diethylene glycol monomethyl ether, diethylene glycol monoethyl ether, diethylene glycol dimethyl ether, ethylene glycol monomethyl ether, ethylene glycol monoethyl ether, and dipropylene glycol monomethyl ether, organic acids such as formic acid, acetic acid, and propionic acid, and aromatics such as toluene, o-xylene, and p-xylene.

As described above, the solvent is appropriately selected according to the metallic compounds containing the metal elements constituting the first electrolyte portion 21 and the second electrolyte portion 22. Therefore, there is a possibility that not only water, but also an oil-based organic solvent is selected as the solvent, and also the solvent is not limited to one type, but by combining a plurality of types of solvents, the solubility of the metallic compounds may be ensured.

In the preparation of the metallic compound solution, each of the above-mentioned metallic compounds is weighed at a concentration in the unit of mole (mol), and added to the selected solvent and dissolved therein by mixing. In order to sufficiently dissolve the metallic compounds, mixing is performed by heating the solvent as needed.

Subsequently, in consideration of the composition of each of the first electrolyte portion 21 and the second electrolyte portion 22 to be obtained as a product, the metallic compound solutions in which the metallic compound is dissolved are weighed for each metal source and mixed, whereby an electrolyte precursor solution is obtained. Specifically, three types of metallic compound solutions containing a lithium compound, a lanthanum compound, and a zirconium compound, respectively, a metallic compound solution containing at least one type of metallic compound selected from a niobium compound, a tantalum compound, and an antimony compound, and an anionic surfactant are mixed at a given mixing ratio.

The anionic surfactant is used for allowing lithium sulfate which enhances the dissociation of lithium ions to exist between the active material particle 11a and the electrolyte 20 (in this case, the first electrolyte portion 21 and the second electrolyte portion 22) as described above, and preferably contains lithium which is an active material. Further, the anionic surfactant contains a hydrophobic group R to which a sulfate group ($SO_4^{2-}$) which is a hydrophilic group and lithium (Li) are bonded, and the hydrophobic group R preferably has 4 or more carbon atoms or is preferably a fluorinated alkyl group. When the hydrophobic group R has 4 or more carbon atoms or is a fluorinated alkyl group, the hydrophobicity is improved, and the function as a surfactant is exhibited, and also the range of selection of the above-mentioned solvent can be expanded on the oil-based side. Therefore, the anionic surfactant is represented by the following formula (3).

$$R\text{—}SO_4\text{—}Li \tag{3}$$

Specific examples of the hydrophobic group R having 4 or more carbon atoms include linear alkyl groups such as an n-butyl group, an n-pentyl group, an n-hexyl group, an n-heptyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, and an n-octadecyl group, branched alkyl groups such as a sec-butyl group, a tert-butyl group, an iso-amyl group, a tert-amyl group, and a 2-ethylhexyl group, and fluorinated alkyl groups such as a 2-fluoroethyl group and a 2,2,2-trifluoroethyl group.

In this embodiment, lithium dodecyl sulfate (LDS) in which a sulfate group ($SO_4^{2-}$) and lithium (Li) are bonded to the hydrophobic group R which is an alkyl group having 12 carbon atoms is used as the anionic surfactant.

As shown in FIG. 5, when an anionic surfactant 25 is mixed with, for example, an aqueous solvent, a micelle 25m in which a plurality of molecules of the anionic surfactant 25 gather with the sulfate group ($SO_4^{2-}$) facing outward and the hydrophobic group R facing inward is formed in the solvent. In the case where the anionic surfactant 25 is mixed with an oil-based solvent, a micelle 25m in which a plurality of molecules of the anionic surfactant 25 gather with the hydrophobic group R facing outward and the sulfate group ($SO_4^{2-}$) facing inward is formed. The concentration of the anionic surfactant 25 at which the micelle 25m is formed in the solvent in this manner is called □critical micelle concentration (CMC)□. The critical micelle concentration (CMC) of lithium dodecyl sulfate (LDS) as the anionic surfactant 25 is 3.0 mmol (millimoles)/kg (solution).

The content of the anionic surfactant 25 in the electrolyte precursor solution is preferably such that the anionic surfactant 25 is in a state of being dispersed to some extent in the solution from the viewpoint that the effect of the anionic surfactant 25 is reliably brought about. In this embodiment, the content of the anionic surfactant 25 with respect to the total amount of the solution is set to 5 times or more and 15 times or less the critical micelle concentration. When the content of the anionic surfactant 25 in the solution exceeds 15 times the critical micelle concentration, most of the anionic surfactant 25 is micellized in the solution, and the amount of the anionic surfactant 25 to be dispersed in the solution is decreased. Then, the process proceeds to the step S2.

In the step S2, a porous active material portion 11 is formed. Specifically, first, a positive electrode active material ingredient (lithium composite metal oxide) in the form of particles (powder) is prepared. In this embodiment, $LiCoO_2$ (hereinafter referred to as ◻LCO◻ for short) in the form of particles is used as the positive electrode active material ingredient. The average particle diameter (D50) of the positive electrode active material ingredient is, for example, preferably 300 nm or more and 20 μm or less, more preferably 5 μm or more and 15 μm or less. The average particle diameter is measured, for example, using a light scattering particle size distribution analyzer (for example, Nanotrac UPA-EX250, manufactured by Nikkiso Co., Ltd.) after dispersing the LCO particles in n-octanol at a concentration of 0.1 mass % to 10 mass %. When the average particle diameter is too small, the voids become smaller, and it becomes difficult to fill the voids with the electrolyte in the subsequent step. On the other hand, when the average particle diameter is too large, the specific surface area of the active material portion 11 becomes smaller, and the output of the lithium battery 100 is decreased.

Figure 6:
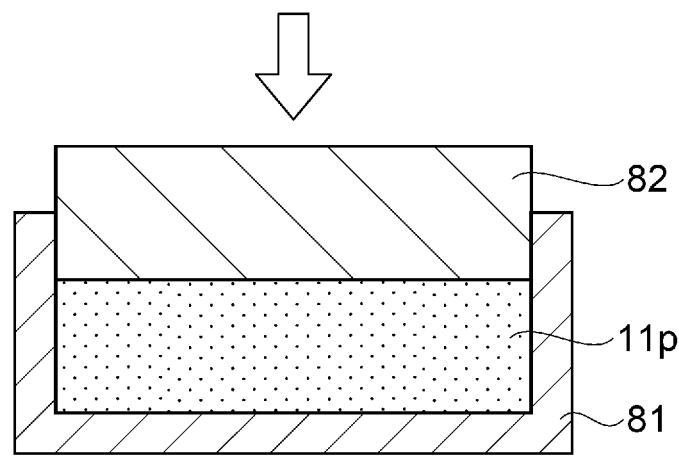
FIG. 6 is a schematic view showing a step in the method for producing an electrode assembly.

Subsequently, as shown in FIG. 6, a powder 11p of the positive electrode active material ingredient is placed in a die (mold) 81 and compression-molded by pressing at a pressure of, for example, 0.1 MPa to 5.0 MPa using a pressing portion 82. Further, this compressed body is sintered by a heat treatment, whereby the active material portion 11 is obtained. This heat treatment is performed under a temperature condition which is 850° C. or higher and lower than the temperature which is the lower of either the melting point or the decomposition point of the lithium composite metal oxide to be used as the positive electrode active material ingredient in consideration of the evaporation of lithium. The melting point of LCO as the lithium composite metal oxide is higher than 1000° C., and therefore, this heat treatment is preferably performed at 900° C. or higher and 1000° C. or lower. Further, this heat treatment is preferably performed for 5 minutes or more and 36 hours or less, more preferably performed for 4 hours or more and 14 hours or less.

To the positive electrode active material ingredient, a polymer compound which functions as a binder may be added. Examples of such a polymer compound include polyvinylidene fluoride (PVdF), polyvinyl alcohol (PVA), and polypropylene carbonate (PPC). Such a polymer compound is burned or oxidized in the heat treatment in this step, and the amount thereof is reduced or the compound is destroyed by burning.

Further, to the positive electrode active material ingredient, a pore forming material may be added. The pore forming material refers to a material (for example, a polymer compound or a carbon powder) to serve as the template of a void. By adding the pore forming material, the bulk density porosity of the active material portion 11 can be controlled. The pore forming material is burned or oxidized in the heat treatment in this step, and the amount thereof is reduced. The average particle diameter of the pore forming material is preferably from 0.5 μm to 10 μm. The pore forming material may contain particles composed of a deliquescent material. Water formed around the particles by deliquescence of the particles functions as a binder for binding the lithium composite metal oxide in the form of particles. Therefore, the shape of the compressed body can be maintained from when the positive electrode active material ingredient in the form of particles is compression-molded until when the heat treatment is performed.

The method for forming the porous active material portion 11 having a bulk density porosity of 40% to 60% is not limited to a press-sintering method, and for example, a green sheet method may be used. Specifically, an LCO powder in which the average particle diameter D50 of the particle size distribution is about 5 μm is mixed with 1,4-dioxane as the solvent in which PPC as the binder (binding agent) is dissolved to form a slurry, and the slurry is applied to a polyethylene terephthalate (PET) film substrate using an automatic film applicator (manufactured by Cotec Corporation), whereby a sheet is formed.

The composition of the slurry at this time can take an arbitrary value in accordance with the thickness of a desired sheet or the performance of the applicator. Further, to the slurry, an auxiliary agent such as a dispersant, a defoaming agent, or a pore forming material may be added as needed.

The thus formed sheet is punched with an appropriate punch, whereby a pellet formed into a circular disk shape with a diameter of, for example, about 10 mm is obtained. This pellet is degreased at about 300° C., and thereafter placed on a substrate composed of, for example, magnesium oxide and fired using, for example, an electric muffle furnace. The firing temperature is 850° C. or higher and is preferably a temperature of 875° C. or higher and 1000° C. or lower, which is lower than the melting point of LCO serving as the positive electrode active material ingredient. The firing time is preferably set to, for example, 5 minutes or more and 36 hours or less, and is more preferably 4 hours or more and 14 hours or less.

According to this, the LCO particles are sintered to one another, and thus, the active material portion 11 which is a porous sintered body having voids (internal cavities) inside is obtained. Then, the process proceeds to the step S3.

Figure 7:
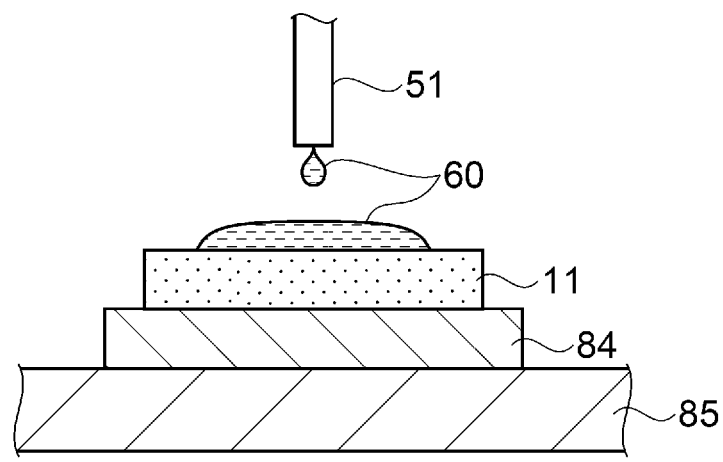
FIG. 7 is a schematic view showing a step in the method for producing an electrode assembly.

In the step S3, the porous active material portion 11 is impregnated with the electrolyte precursor solution prepared in the step S1 and dried. Specifically, as shown in FIG. 7, the shaped active material portion 11 is placed on a hot plate 85 through a substrate 84. The substrate 84 is composed of, for example, magnesium oxide or the like which is heat resistant and prevents the active material portion 11 from coming into direct contact with the hot plate 85 so as to suppress deterioration of the active material portion 11 by heating when heating is performed with the hot plate 85.

A predetermined amount of the electrolyte precursor solution 60 is dropped from a nozzle 51 onto the active material portion 11 placed on the substrate 84 using, for example, a constant amount discharger. Since the active material portion 11 is a porous material, the dropped electrolyte precursor solution 60 permeates the active material portion 11 by capillary phenomenon. In the case where the electrolyte precursor solution 60 remains on the surface of the active material portion 11 after a predetermined amount of the electrolyte precursor solution 60 is dropped, this solution is removed by wiping with a non-woven fabric or the like. The electrolyte precursor solution 60 contains the anionic surfactant 25, and therefore, the wettability of the electrolyte precursor solution 60 on the active material portion 11 is improved, and the electrolyte precursor solution 60 can be efficiently filled in the voids inside the active material portion 11. Then, the solvent is dried by setting the temperature of the hot plate 85 to a temperature, which is lower than 100° C. and at which the solvent can be evaporated. The set temperature and the drying time depend on the type of the solvent, however, after the active material portion 11 reaches the set temperature, drying is performed for about 15 minutes. Subsequently, the temperature of the hot plate 85 is set to, for example, 360° C., and heating is performed for 10 minutes, whereby hydrocarbons contained in the electrolyte precursor solution 60 are burned and decomposed. Further, heating is performed for 10 minutes by setting the temperature of the hot plate 85 to, for example, 540° C. which is lower than the sintering temperature of the active material portion 11, whereby the active material portion 11 is calcined. Then, the active material portion 11 is gradually cooled until the temperature thereof is decreased to 50° C. or lower. According to this, the active material portion 11 is impregnated with the electrolyte precursor solution 60, followed by drying and calcination, whereby various types of metallic compounds contained in the electrolyte precursor solution 60 and the anionic surfactant 25 are deposited in the voids inside the active material portion 11.

By measuring the mass before and after the procedure of impregnation of the active material portion 11 with the electrolyte precursor solution 60, and drying and calcination, the filling ratio of the electrolyte in the voids of the active material portion 11 is determined. Based on the determined filling ratio of the electrolyte, the step S3 is repeated until the filling ratio reaches the desired state (for example, 70% or more). Then, the process proceeds to the step S4.

Figure 8:
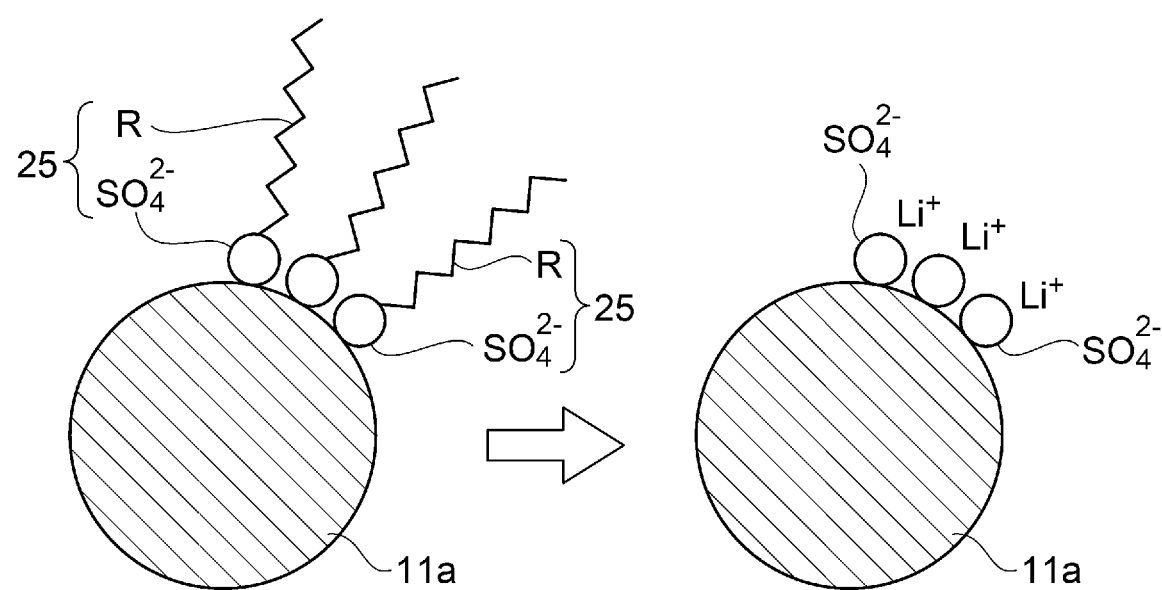
FIG. 8 is a schematic view showing a step in the method for producing an electrode assembly.

In the step S4, the active material portion 11 after completion of impregnation with the electrolyte precursor solution 60, and drying and calcination is fired (main firing). Specifically, a calcined body of the active material portion 11 is placed in a pot which is heat resistant and is composed of, for example, magnesium oxide or the like, and the pot is covered with a lid. Then, the pot is placed in, for example, an electric muffle furnace, and firing is performed for, for example, 8 hours at a temperature from 900° C. to 1000° C. or lower, which is lower than the melting point of LCO particles (that is, the active material particles 11a) constituting the active material portion 11 and higher than the calcination temperature. According to this, various types of metallic compounds filled in the voids in the calcined body of the active material portion 11 are subjected to a heat treatment, whereby a crystalline first electrolyte portion 21 and an amorphous second electrolyte portion 22 are formed. Further, as shown in FIG. 8, the anionic surfactant 25 (lithium dodecyl sulfate) adhered to the surface of the active material particle 11a is thermally decomposed to remove the hydrophobic group R, whereby lithium sulfate is formed on the surface of the active material particle 11a. That is, the active material portion 11 is brought to a state where lithium sulfate exists between the active material particle 11a and the electrolyte (the first electrolyte portion 21 and the second electrolyte portion 22) in the voids of the active material portion 11. In this embodiment, a body in a state where the active material portion 11 and the electrolyte (the first electrolyte portion 21 and the second electrolyte portion 22) are combined after the main firing is completed is called □main fired body 10p□. Then, the process proceeds to the step S5.

Figure 9:
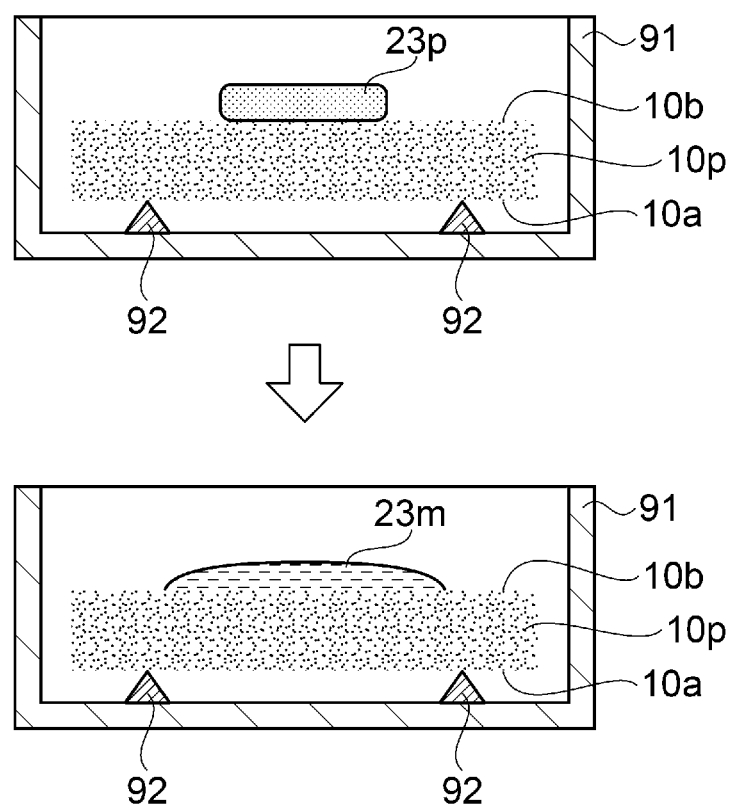
FIG. 9 is a schematic view showing a step in the method for producing an electrode assembly.

In the step S5, a third electrolyte is further filled in the voids of the main fired body 10p. Specifically, as shown in FIG. 9, first, the main fired body 10p is placed in a pot 91. The main fired body 10p is supported by a support needle 92 provided on the bottom face of the pot 91. The pot 91 is composed of, for example, magnesium oxide, and the support needle 92 is composed of, for example, gold (Au). On the main fired body 10p, a third electrolyte 23p in a solid form is placed. In this embodiment, a face of the main fired body 10p supported by the support needle 92 is to become the other face 10a of the electrode assembly 10 described above. On the other hand, a face of the main fired body 10p on which the third electrolyte 23p is placed is referred to as □one face 10b□.

In this embodiment, as the third electrolyte 23p, LCBO ($Li_{2+x}C_{1-x}B_xO_3$) having a lower melting point than LLZrAO constituting the first electrolyte portion 21 is used. The melting point of LCBO is about 700° C., and therefore, the pot 91 is heated to about 800° C. in an atmosphere containing carbon dioxide ($CO_2$) gas to melt the third electrolyte 23p placed on the main fired body 10p, whereby a melt 23m is obtained. The melt 23m is impregnated into the main fired body 10p which is a porous material by capillary phenomenon. Thereafter, the pot 91 is rapidly cooled to room temperature, whereby the impregnated melt 23m is solidified. The melt 23m of the third electrolyte 23p is further filled in the voids remaining between the particles of the sintered active material particles 11a inside the main fired body 10p and becomes the third electrolyte portion 23 after cooling. By adjusting the amount of the melt 23m, the surface of the main fired body 10p is also covered with the third electrolyte portion 23. By doing this, the electrode assembly 10 in which the electrolyte 20 (the first electrolyte portion 21, the second electrolyte portion 22, and the third electrolyte portion 23) is filled in the porous main fired body 10p is completed. The average thickness of the electrode assembly 10 at this time is, for example, about 110 μm. Then, the process proceeds to the step S6. The ion conductivity of LOBO is about $8.0 \times 10^{-7}$ [S/cm] and is lower than that of the first electrolyte portion 21.

Figure 10:
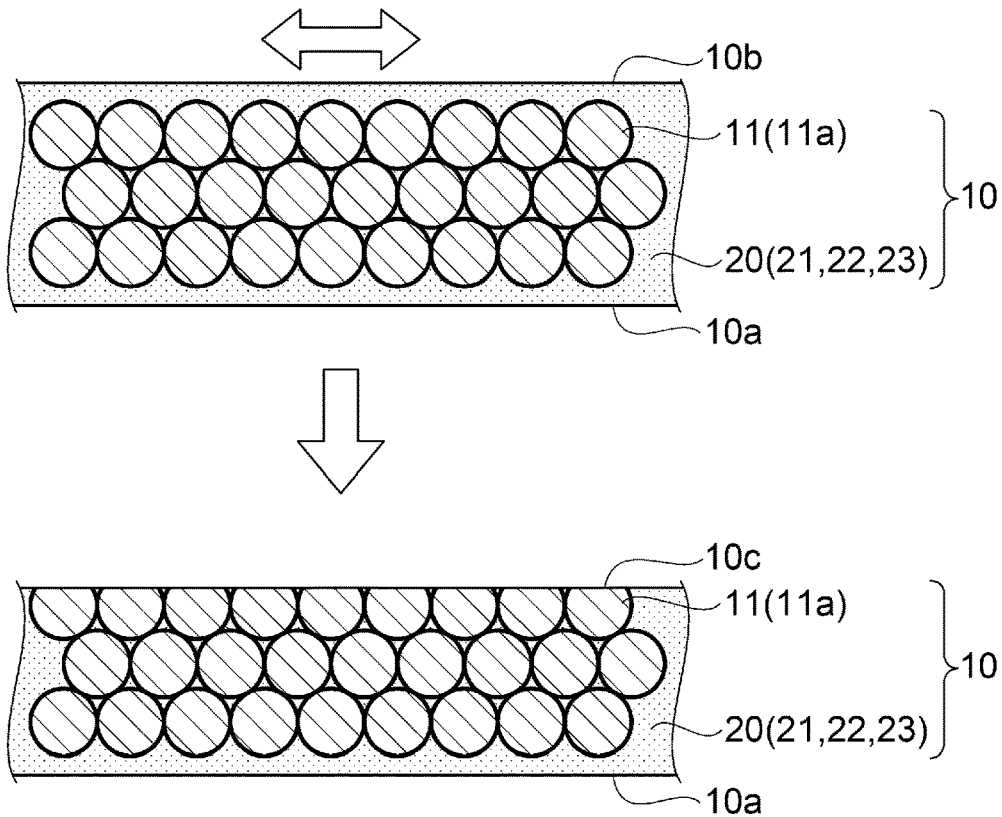
FIG. 10 is a schematic view showing a step in the method for producing an electrode assembly.

In the step S6, as shown in FIG. 10, the one face 10b of the electrode assembly 10 in which the electrolyte 20 is filled is polished, whereby the active material particles 11a are exposed. The face on which the active material particles 11a are exposed is a polished face and corresponds to the one face 10c of the electrode assembly 10 shown in FIG. 2. Examples of a method for polishing the one face 10b of the electrode assembly 10 in this manner include a chemical mechanical polishing treatment (CMP treatment). In the case where the plurality of active material particles 11a are sufficiently exposed on the one face 10b after filling the melt 23m of the third electrolyte 23p in the main fired body 10p in the step S5, the polishing treatment is not necessarily performed. That is, the step S6 may be omitted.

Thereafter, an electrolyte layer 24 is formed on the other face 10a of the electrode assembly 10. In this embodiment, the electrolyte layer 24 is formed by depositing LCBO which is the same material as that of the third electrolyte portion 23 using a sputtering method. The thickness of the electrolyte layer 24 may be 1.5 μm or more and 100 μm or less, and is set to 2.5 μm in this embodiment.

Subsequently, a negative electrode 30 is stacked and formed on the electrolyte layer 24. In this embodiment, the negative electrode 30 is formed by depositing metallic lithium using a sputtering method. The thickness of the negative electrode 30 may be within a range of 50 nm or more and 100 µm or less, and is set to about 15 µm in consideration of the discharge capacity in this embodiment.

Subsequently, as shown in FIG. 2, a current collector 41 is formed so as to come into contact with the one face 10c of the electrode assembly 10, and a current collector 42 is formed so as to come into contact with the negative electrode 30. In this embodiment, the current collectors 41 and 42 are formed by adhering a copper foil having a thickness of about 20 µm, followed by press-bonding. By doing this, the lithium battery 100 is completed.

Next, effects when electrolyte precursor solutions of Examples are used will be described by showing more specific Examples and Comparative Examples of the electrolyte precursor solution to be used for forming the electrode assembly 10.

Example 1

The electrolyte precursor solution of Example 1 is an electrolyte precursor solution in which the metallic compound constituting the crystalline first electrolyte portion 21 is represented by $Li_{6.7}La_3Zr_{1.7}Nb_{0.3}O_{12}$ (LLZrNbO) and contains lithium dodecyl sulfate (LDS) as an anionic surfactant at a concentration 5 times the critical micelle concentration (CMC). Hereinafter, the preparation of metallic compound solutions to be used and the preparation of the electrolyte precursor solution will be described.

Preparation of 1 mol/kg Lithium Compound Solution

In a 20-mL reagent bottle made of Pyrex (trademark) containing a stirrer bar, 0.6895 g of lithium nitrate 3N5 (manufactured by Kanto Chemical Co., Inc.) as a lithium source and 9.3105 g of 2-n-butoxyethanol (manufactured by Kanto Chemical Co., Inc.) as a solvent are weighed, and the bottle is placed on a hot plate with a stirrer function at a stirrer rotation speed of 300 rpm with an adjusted temperature of 170° C. Heating and stirring are performed for 30 minutes until lithium nitrate is completely dissolved. Thereafter, the resulting solution is gradually cooled to room temperature and used as a 1 mol/kg lithium nitrate/2-n-butoxyethanol solution.

Preparation of 1 mol/kg Lanthanum Compound Solution

In a 20-mL reagent bottle made of Pyrex (trademark) containing a stirrer bar, 4.3301 g of lanthanum nitrate hexahydrate 4N (manufactured by Kanto Chemical Co., Inc.) as a lanthanum source and 5.6699 g of 2-n-butoxyethanol (manufactured by Kanto Chemical Co., Inc.) as a solvent are weighed, and the bottle is placed on a hot plate with a stirrer function at a stirrer rotation speed of 300 rpm with an adjusted temperature of 140° C. Heating and stirring are performed for 30 minutes until lanthanum nitrate hexahydrate is completely dissolved. Thereafter, the resulting solution is gradually cooled to room temperature and used as a 1 mol/kg lanthanum nitrate hexahydrate/2-n-butoxyethanol solution.

Preparation of 1 mol/kg Zirconium Compound Solution

In a 20-mL reagent bottle made of Pyrex (trademark) containing a stirrer bar, 4.7960 g of an 80 mass % butanol solution of zirconium tetrabutoxide (manufactured by Gelest, Inc.) as a zirconium source and 5.2040 g of 2-n-butoxyethanol (manufactured by Kanto Chemical Co., Inc.) as a solvent are weighed, and the bottle is placed on a stirrer at a stirrer rotation speed of 300 rpm. Stirring is performed for 10 minutes until the 80 mass % butanol solution of zirconium tetrabutoxide and 2-n-butoxyethanol are completely mixed. After completion of stirring, the resulting solution is used as a 1 mol/kg zirconium tetrabutoxide/2-n-butoxyethanol solution.

Preparation of 1 mol/kg Niobium Compound Solution

In a 20-mL reagent bottle made of Pyrex (trademark) containing a stirrer bar, 3.1821 g of niobium pentaethoxide (manufactured by Kojundo Chemical Lab. Co., Ltd.) as a niobium source and 6.8179 g of 2-n-butoxyethanol (manufactured by Kanto Chemical Co., Inc.) as a solvent are weighed, and the bottle is placed on a stirrer at a stirrer rotation speed of 300 rpm. Stirring is performed for 10 minutes until niobium pentaethoxide and 2-n-butoxyethanol are completely mixed. After completion of stirring, the resulting solution is used as a 1 mol/kg niobium pentaethoxide/2-n-butoxyethanol solution.

Preparation of 15 mmol/kg Anionic Surfactant Solution (5 times CMC)

In a 20-mL reagent bottle made of Pyrex (trademark) containing a stirrer bar, 0.0409 g of lithium dodecyl sulfate (LDS) (manufactured by Acros Organics Co., Ltd.) as an anionic surfactant and 9.9591 g of ethanol as a solvent are weighed, and the bottle is placed on a hot plate with a stirrer function at a stirrer rotation speed of 300 rpm with an adjusted temperature of 165° C. Heating and stirring are performed for 30 minutes until LDS is completely dissolved. Thereafter, the resulting solution is gradually cooled to room temperature and used as a 15 mmol/kg LDS/ethanol solution.

Preparation of LLZrNbO Precursor Solution

In a 20-mL reagent bottle made of Pyrex (trademark) containing a stirrer bar, 8.0400 g of the 1 mol/kg lithium nitrate/2-n-butoxyethanol solution, 3.0000 g of the 1 mol/kg lanthanum nitrate hexahydrate/2-n-butoxyethanol solution, 1.7000 g of the 1 mol/kg zirconium tetrabutoxide/2-n-butoxyethanol solution, 0.3000 g of the 1 mol/kg niobium pentaethoxide/2-n-butoxyethanol solution, and 1.0000 g of the 15 mmol/kg LDS/ethanol solution are weighed, and the bottle is placed on a stirrer at a stirrer rotation speed of 300 rpm.

Stirring is performed for 10 minutes until the mixture is completely mixed. After completion of stirring, the resulting solution is used as a 1 mol/kg $Li_{6.7}La_3Zr_{1.7}Nb_{0.3}O_{12}$ precursor (+LDS at a concentration 5 times the CMC) solution.

Example 2

The electrolyte precursor solution of Example 2 has the same configuration as that of Example 1 except that the concentration of LDS as the anionic surfactant in Example 1 is changed to 15 times the CMC. That is, with respect to a lithium source (lithium nitrate), a lanthanum source (lanthanum nitrate hexahydrate), a zirconium source (zirconium tetrabutoxide), and a niobium source (niobium pentaethoxide), 1 mol/kg solutions are prepared, respectively, in the same manner as in Example 1.

Preparation of 45 mmol/kg Anionic Surfactant Solution (15 Times CMC)

In a 20-mL reagent bottle made of Pyrex (trademark) containing a stirrer bar, 0.1225 g of LDS as an anionic surfactant and 9.8775 g of ethanol as a solvent are weighed, and the bottle is placed on a hot plate with a stirrer function at a stirrer rotation speed of 300 rpm with an adjusted temperature of 165° C. Heating and stirring are performed for 30 minutes until LDS is completely dissolved. Thereafter, the resulting solution is gradually cooled to room temperature and used as a 45 mmol/kg LDS/ethanol solution.

21

Preparation of LLZrNbO Precursor Solution

In a 20-mL reagent bottle made of Pyrex (trademark) containing a stirrer bar, 8.0400 g of the 1 mol/kg lithium nitrate/2-n-butoxyethanol solution, 3.0000 g of the 1 mol/kg lanthanum nitrate hexahydrate/2-n-butoxyethanol solution, 1.7000 g of the 1 mol/kg zirconium tetrabutoxide/2-n-butoxyethanol solution, 0.3000 g of the 1 mol/kg niobium pentaethoxide/2-n-butoxyethanol solution, and 1.0000 g of the 45 mmol/kg LDS/ethanol solution are weighed, and the bottle is placed on a stirrer at a stirrer rotation speed of 300 rpm. Stirring is performed for 10 minutes until the mixture is completely mixed. After completion of stirring, the resulting solution is used as a 1 mol/kg $Li_{6.7}La_3Zr_{1.7}Nb_{0.3}O_{12}$ precursor (+LDS at a concentration 15 times the CMC) solution.

Example 3

The electrolyte precursor solution of Example 3 is an electrolyte precursor solution in which the metallic compound constituting the crystalline first electrolyte portion 21 is represented by $Li_{6.2}La_3Zr_{1.2}Sb_{0.4}Ta_{0.4}O_{12}$ (LLZrSbTaO) and contains LDS as an anionic surfactant at a concentration 10 times the critical micelle concentration (CMC). Hereinafter, the preparation of metallic compound solutions to be used and the preparation of the electrolyte precursor solution will be described.

With respect to a lithium source (lithium nitrate), a lanthanum source (lanthanum nitrate hexahydrate), and a zirconium source (zirconium tetrabutoxide), 1 mol/kg solutions are prepared, respectively, in the same manner as in Example 1.

Preparation of 1 mol/kg Antimony Compound Solution

In a 20-mL reagent bottle made of Pyrex (trademark) containing a stirrer bar, 2.5694 g of antimony triethoxide (manufactured by Kojundo Chemical Lab. Co., Ltd.) as an antimony source and 7.4306 g of 2-n-butoxyethanol (manufactured by Kanto Chemical Co., Inc.) as a solvent are weighed, and the bottle is placed on a stirrer at a stirrer rotation speed of 300 rpm. Stirring is performed for 10 minutes until antimony triethoxide and 2-n-butoxyethanol are completely mixed. After completion of stirring, the resulting solution is used as a 1 mol/kg antimony triethoxide/2-n-butoxyethanol solution.

Preparation of 1 mol/kg Tantalum Compound Solution

In a 20-mL reagent bottle made of Pyrex (trademark) containing a stirrer bar, 4.0625 g of tantalum pentaethoxide (manufactured by Kojundo Chemical Lab. Co., Ltd.) as a tantalum source and 5.9375 g of 2-n-butoxyethanol (manufactured by Kanto Chemical Co., Inc.) as a solvent are weighed, and the bottle is placed on a stirrer at a stirrer rotation speed of 300 rpm. Stirring is performed for 10 minutes until tantalum pentaethoxide and 2-n-butoxyethanol are completely mixed. After completion of stirring, the resulting solution is used as a 1 mol/kg tantalum pentaethoxide/2-n-butoxyethanol solution.

Preparation of 30 mmol/kg Anionic Surfactant Solution (10 Times CMC)

In a 20-mL reagent bottle made of Pyrex (trademark) containing a stirrer bar, 0.0817 g of LDS as an anionic surfactant and 9.9183 g of ethanol as a solvent are weighed, and the bottle is placed on a hot plate with a stirrer function at a stirrer rotation speed of 300 rpm with an adjusted temperature of 165° C. Heating and stirring are performed for 30 minutes until LDS is completely dissolved. Thereafter, the resulting solution is gradually cooled to room temperature and used as a 30 mmol/kg LDS/ethanol solution.

22

Preparation of LLZrSbTaO Precursor Solution

In a 20-mL reagent bottle made of Pyrex (trademark) containing a stirrer bar, 7.4400 g of the 1 mol/kg lithium nitrate/2-n-butoxyethanol solution, 3.0000 g of the 1 mol/kg lanthanum nitrate hexahydrate/2-n-butoxyethanol solution, 1.2000 g of the 1 mol/kg zirconium tetrabutoxide/2-n-butoxyethanol solution, 0.4000 g of the 1 mol/kg antimony triethoxide/2-n-butoxyethanol solution, 0.4000 g of the 1 mol/kg tantalum pentaethoxide/2-n-butoxyethanol solution, and 1.0000 g of the 30 mmol/kg LDS/ethanol solution are weighed, and the bottle is placed on a stirrer at a stirrer rotation speed of 300 rpm. Stirring is performed for 10 minutes until the mixture is completely mixed. After completion of stirring, the resulting solution is used as a 1 mol/kg $Li_{6.2}La_3Zr_{1.2}Sb_{0.4}Ta_{0.4}O_{12}$ precursor (+LDS at a concentration 10 times the CMC) solution.

Comparative Example 1

The electrolyte precursor solution of Comparative Example 1 is an electrolyte precursor solution in which the metallic compound constituting the crystalline first electrolyte portion 21 is represented by $Li_{6.7}La_3Zr_{1.7}Nb_{0.3}O_{12}$ (LLZrNbO) and contains LDS as an anionic surfactant at a concentration 4 times the critical micelle concentration (CMC). That is, the concentration of LDS in this electrolyte precursor solution is decreased compared with that of Example 1. Hereinafter, the preparation of metallic compound solutions to be used and the preparation of the electrolyte precursor solution will be described.

With respect to a lithium source (lithium nitrate), a lanthanum source (lanthanum nitrate hexahydrate), a zirconium source (zirconium tetrabutoxide), and a niobium source (niobium pentaethoxide), 1 mol/kg solutions are prepared, respectively, in the same manner as in Example 1.

Preparation of 12 mmol/kg Anionic Surfactant Solution (4 Times CMC)

In a 20-mL reagent bottle made of Pyrex (trademark) containing a stirrer bar, 0.0327 g of LDS as an anionic surfactant and 9.9673 g of ethanol as a solvent are weighed, and the bottle is placed on a hot plate with a stirrer function at a stirrer rotation speed of 300 rpm with an adjusted temperature of 165° C. Heating and stirring are performed for 30 minutes until LDS is completely dissolved. Thereafter, the resulting solution is gradually cooled to room temperature and used as a 12 mmol/kg LDS/ethanol solution.

Preparation of LLZrNbO Precursor Solution

In a 20-mL reagent bottle made of Pyrex (trademark) containing a stirrer bar, 8.0400 g of the 1 mol/kg lithium nitrate/2-n-butoxyethanol solution, 3.0000 g of the 1 mol/kg lanthanum nitrate hexahydrate/2-n-butoxyethanol solution, 1.7000 g of the 1 mol/kg zirconium tetrabutoxide/2-n-butoxyethanol solution, 0.3000 g of the 1 mol/kg niobium pentaethoxide/2-n-butoxyethanol solution, and 1.0000 g of the 12 mmol/kg LDS/ethanol solution are weighed, and the bottle is placed on a stirrer at a stirrer rotation speed of 300 rpm. Stirring is performed for 10 minutes until the mixture is completely mixed. After completion of stirring, the resulting solution is used as a 1 mol/kg $Li_{6.7}La_3Zr_{1.7}Nb_{0.3}O_{12}$ precursor (+LDS at a concentration 4 times the CMC) solution.

Comparative Example 2

The electrolyte precursor solution of Comparative Example 2 is an electrolyte precursor solution in which the metallic compound constituting the crystalline first electrolyte portion 21 is represented by $Li_{6.2}La_3Zr_{1.2}Sb_{0.4}Ta_{0.4}O_{12}$ (LLZrSbTaO) and contains LDS as an anionic surfactant at a concentration 4 times the critical micelle concentration (CMC). That is, the concentration of LDS in this electrolyte precursor solution is decreased compared with that of Example 3. Hereinafter, the preparation of metallic compound solutions to be used and the preparation of the electrolyte precursor solution will be described.

With respect to a lithium source (lithium nitrate), a lanthanum source (lanthanum nitrate hexahydrate), and a zirconium source (zirconium tetrabutoxide), 1 mol/kg solutions are prepared, respectively, in the same manner as in Example 1, and with respect to an antimony source (antimony triethoxide) and a tantalum source (tantalum pentaethoxide), 1 mol/kg solutions are prepared, respectively, in the same manner as in Example 3. As a 12 mmol/kg LDS/ethanol solution, the solution prepared in Comparative Example 1 is used.

Preparation of LLZrSbTaO Precursor Solution

In a 20-mL reagent bottle made of Pyrex (trademark) containing a stirrer bar, 7.4400 g of the 1 mol/kg lithium nitrate/2-n-butoxyethanol solution, 3.0000 g of the 1 mol/kg lanthanum nitrate hexahydrate/2-n-butoxyethanol solution, 1.2000 g of the 1 mol/kg zirconium tetrabutoxide/2-n-butoxyethanol solution, 0.4000 g of the 1 mol/kg antimony triethoxide/2-n-butoxyethanol solution, 0.4000 g of the 1 mol/kg tantalum pentaethoxide/2-n-butoxyethanol solution, and 1.0000 g of the 12 mmol/kg LDS/ethanol solution are weighed, and the bottle is placed on a stirrer at a stirrer rotation speed of 300 rpm. Stirring is performed for 10 minutes until the mixture is completely mixed. After completion of stirring, the resulting solution is used as a 1 mol/kg $Li_{6.2}La_3Zr_{1.2}Sb_{0.4}Ta_{0.4}O_{12}$ precursor (+LDS at a concentration 4 times the CMC) solution.

Comparative Example 3

The electrolyte precursor solution of Comparative Example 3 does not contain an anionic surfactant compared with the electrolyte precursor solution of Example 1. With respect to a lithium source (lithium nitrate), a lanthanum source (lanthanum nitrate hexahydrate), a zirconium source (zirconium tetrabutoxide), and a niobium source (niobium pentaethoxide), 1 mol/kg solutions are prepared, respectively, in the same manner as in Example 1.

Preparation of LLZrNbO Precursor Solution

In a 20-mL reagent bottle made of Pyrex (trademark) containing a stirrer bar, 8.0400 g of the 1 mol/kg lithium nitrate/2-n-butoxyethanol solution, 3.0000 g of the 1 mol/kg lanthanum nitrate hexahydrate/2-n-butoxyethanol solution, 1.7000 g of the 1 mol/kg zirconium tetrabutoxide/2-n-butoxyethanol solution, and 0.3000 g of the 1 mol/kg niobium pentaethoxide/2-n-butoxyethanol solution are weighed, and the bottle is placed on a stirrer at a stirrer rotation speed of 300 rpm. Stirring is performed for 10 minutes until the mixture is completely mixed. After completion of stirring, the resulting solution is used as a 1 mol/kg $Li_{6.7}La_3Zr_{1.7}Nb_{0.3}O_{12}$ precursor solution.

In each of the electrolyte precursor solutions of Examples 1 to 3 and Comparative Examples 1 to 3, the feed amount of the lithium nitrate/2-n-butoxyethanol solution as the lithium source is set to 1.2 times the theoretical composition ratio in consideration of scattering as $Li_2CO_3$ in the air during firing. Further, as the zirconium source, an 80 mass % butanol solution of zirconium (tetra)butoxide is used, and therefore, the amount thereof is set to 1.25 times (1/0.8) the theoretical composition ratio when preparing the electrolyte precursor solutions.

Production of Electrode Assembly

By using each of the electrolyte precursor solutions of Examples 1 to 3 and Comparative Examples 1 to 3, electrode assemblies were produced based on the method for producing an electrode assembly of the above-mentioned first embodiment. Specifically, first, by using LCO particles having an average particle diameter D50 of 5 μm, an active material portion 11 in which the contour size is φ10 mm, the thickness is 150 μm, and the bulk density porosity is about 50% was prepared.

Subsequently, the active material portion 11 was placed on a hot plate 85 through a substrate 84, and 20 μL of the electrolyte precursor solution of Example 1 was dropped thereon, thereby impregnating the porous active material portion 11 with the solution by utilizing capillary phenomenon (see FIG. 7). In the case where the electrolyte precursor solution remained on the surface of the active material portion 11, the solution was wiped off with Kimwipes wipers S-200 (trademark, manufactured by Nippon Paper Crecia Co., Ltd.). Then, the temperature of the hot plate 85 was set to 87° C., and after the temperature reached 87° C., the solvent was dried for 15 minutes. Subsequently, the temperature of the hot plate 85 was set to 360° C., and after the temperature reached 360° C., the hydrocarbons contained in the electrolyte precursor solution were burned and decomposed for 10 minutes. Further, the temperature of the hot plate 85 was set to 540° C., and after the temperature reached 540° C., calcination was performed for 10 minutes. Thereafter, the resulting calcined body was gradually cooled to 50° C. or lower.

After the above-mentioned procedure was performed 10 times, the mass of the obtained calcined body was measured. Thereafter, the calcined body was fired at 900° C. for 8 hours using an electric muffle furnace, whereby a main fired body 10p was obtained. Then, the mass of the main fired body 10p was measured.

The bulk density porosity of the main fired body 10p was determined based on the result of measurement of the mass, and a third electrolyte 23p in the form of a powder composed of LCBO was weighed according to the bulk density porosity. The main fired body 10p was placed in a pot 91, and the weighed third electrolyte 23p was placed on the main fired body 10p and heated in an atmosphere containing carbon dioxide gas, thereby melting the third electrolyte 23p (see FIG. 9). The main fired body 10p was impregnated with the resulting melt 23m, followed by cooling, whereby an electrode assembly of Example 1 in which the voids of the active material portion 11 were filled with the electrolyte 20 including a crystalline first electrolyte portion 21, an amorphous second electrolyte portion 22, and an amorphous third electrolyte portion 23 was obtained. In Example 1, the mass of the melted LCBO powder is about 5 mg.

Electrode assemblies were produced in the same manner as described above using each of the electrolyte precursor solutions of Examples 2 and 3 and Comparative Examples 1 to 3.

With respect to the lithium ion conductivities obtained by AC impedance measurement of each of the electrode assemblies obtained using the electrolyte precursor solutions of Examples 1 to 3 and Comparative Examples 1 to 3, the values of bulk, grain boundary, and total ion conductivities of the electrolyte in each of the electrode assemblies are shown in the following Table 1. In the AC impedance measurement, in order to completely exclude the electron conduction property in the electrode assembly and observe only the lithium ion conduction property, a material obtained by depositing LCBO as an electrolyte to a film thickness of about 2 μm by a sputtering method on both faces of the electrode assembly (including the active material portion 11, the first electrolyte portion 21, and the second electrolyte portion 22) in the form of a pellet, and thereafter, depositing metallic lithium (Li) by a sputtering method in the same manner to form an electrode was used as a sample of each of the respective Examples and Comparative Examples.

TABLE 1

| | Ion conductivity (S/cm) | | |
|---|---|---|---|
| | Bulk | Grain boundary | Total |
| Example 1 | — | — | $4.0 \times 10^{-4}$ |
| Example 2 | — | — | $4.0 \times 10^{-4}$ |
| Example 3 | — | — | $5.8 \times 10^{-4}$ |
| Comparative Example 1 | $6.2 \times 10^{-4}$ | $2.2 \times 10^{-4}$ | $1.6 \times 10^{-4}$ |
| Comparative Example 2 | — | — | $2.0 \times 10^{-4}$ |
| Comparative Example 3 | $5.0 \times 10^{-4}$ | $1.0 \times 10^{-4}$ | $8.3 \times 10^{-5}$ |

As shown in Table 1, in Comparative Example 1 in which the concentration of the anionic surfactant (LDS) was 4 times the critical micelle concentration (CMC) and Comparative Example 3 in which LDS was not added, a grain boundary resistance existed between the active material portion 11 and the electrolyte 20, and therefore, bulk and grain boundary ion conductivities were obtained in both cases. It is considered that the reason why bulk and grain boundary ion conductivities were not obtained in Comparative Example 2 in which the concentration of LDS was 4 times the CMC is because LLZrSbTaO as the electrolyte includes the crystalline first electrolyte portion 21 and the amorphous second electrolyte portion 22 and behaves as if the grain boundary between the crystalline material and the amorphous material disappears. In Comparative Examples 1 to 3, the total ion conductivity of Comparative Example 3 in which LDS was not added is $8.3 \times 10^{-5}$ [S/cm], which is the lowest.

On the other hand, in each of Examples 1 to 3 in which LDS was added at a concentration 5 times or more the CMC, bulk and grain boundary ion conductivities were not obtained, and a higher total ion conductivity than in Comparative Examples 1 to 3 was obtained. This is considered to be because since LDS is contained in the electrolyte precursor solution at a concentration 5 times or more the CMC, lithium sulfate derived from LDS exists between the active material portion 11 and the electrolyte, and the grain boundary resistance becomes smaller even if it is compared with that of Comparative Example 2.

Subsequently, lithium batteries using the electrode assemblies of Examples 1 to 3 and Comparative Examples 1 to 3 were produced based on the method for producing a lithium battery of the above-mentioned first embodiment, and the results of evaluation of the battery characteristic thereof are shown in the following Table 2. In the evaluation of the battery characteristic, charge and discharge were performed at 100 μA. (0.2C), and a case where the discharge amount with respect to the initial charge amount was 90% or more, and also the 10th discharge amount with respect to the initial discharge amount was maintained at 90% was evaluated as ☐A (suitable)☐, and the other cases were evaluated as ☐B (unsuitable)☐.

TABLE 2

| | Crystalline first electrolyte | Amorphous third electrolyte | Concentration of LDS (magnification to CMC) | 1st charge and discharge | 10th charge and discharge | Evaluation of battery characteristic |
|---|---|---|---|---|---|---|
| Example 1 | LLZrNbO | LCBO | 5 times | 500 μA / 450 μA | 500 μA / 405 μA | A |
| Example 2 | LLZrNbO | LCBO | 15 times | 500 μA / 450 μA | 500 μA / 405 μA | A |
| Example 3 | LLZrSbTaO | LCBO | 10 times | 500 μA / 455 μA | 500 μA / 414 μA | A |
| Comparative Example 1 | LLZrNbO | LCBO | 4 times | 500 μA / 400 μA | 500 μA / 300 μA | B |
| Comparative Example 2 | LLZrSbTaO | LCBO | 4 times | 500 μA / 450 μA | 500 μA / 351 μA | B |
| Comparative Example 3 | LLZrNbO | LCBO | — | 500 μA / 200 μA | 500 μA / 100 μA | B |

As shown in the above Table 2, for each of the lithium batteries using the electrode assemblies of Comparative Examples 1 to 3, the battery characteristic was evaluated as ☐B (unsuitable)☐. In particular, in Comparative Example 3 in which the anionic surfactant (LDS) was not used, the initial discharge amount was 200 IAA which was less than half of the charge amount, and also the 10th discharge amount was half of the initial discharge amount.

On the other hand, for each of Example 1 in which the concentration of LDS was 5 times the CMC, Example 2 in which the concentration of LDS was 15 times the CMC, and Example 3 in which the concentration of LDS was 10 times the CMC, the battery characteristic was evaluated as ☐A (suitable)☐. That is, by using the electrolyte precursor solution containing the anionic surfactant (LDS) at a concentration 5 times or more and 15 times or less the critical micelle concentration (CMC), the grain boundary resistance between the active material portion 11 and the electrolyte 20 is decreased, and the electrode assembly 10 having an excellent total ion conductivity can be formed. By using this electrode assembly 10 as a positive electrode, the lithium battery 100 having an excellent battery characteristic can be provided and produced.

In the electrolyte precursor solution containing the anionic surfactant (LDS) at a concentration exceeding 15 times the critical micelle concentration (CMC), almost all the LDS is micellized, and therefore, LDS is hardly bonded to the surface of the active material particle 11a as the anionic surfactant, and the function of the anionic surfactant (LDS) cannot be performed, and thus, a preferred battery characteristic was not obtained in the same manner as in Comparative Example 3.

Second Embodiment

Electronic Apparatus

Figure 11:
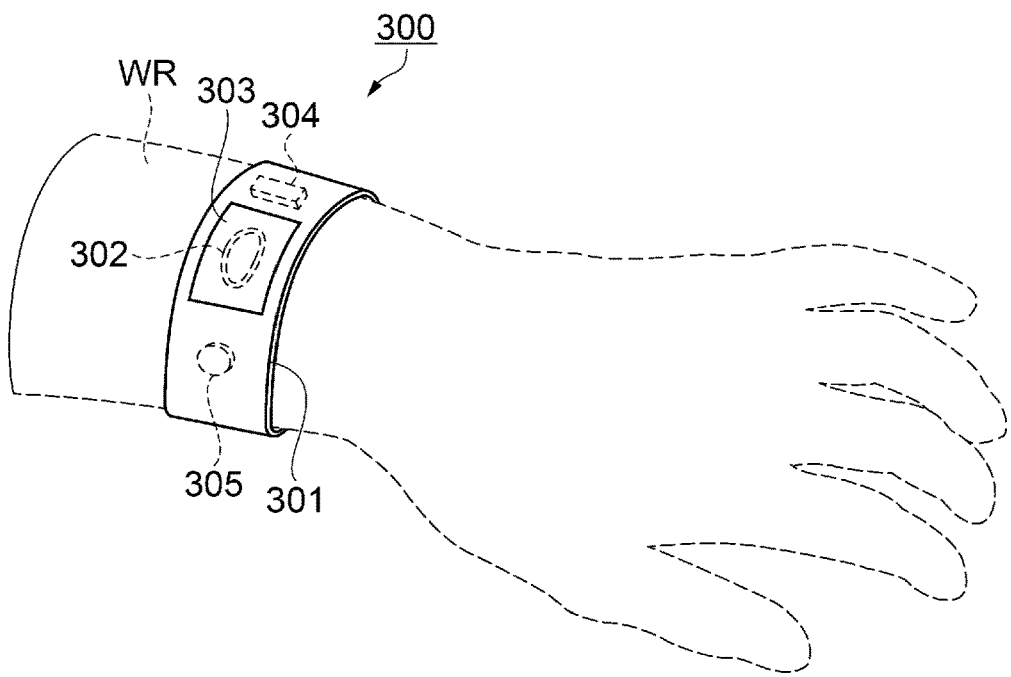
FIG. 11 is a perspective view showing a structure of a wearable apparatus as an electronic apparatus of a second embodiment.

Next, an electronic apparatus of this embodiment will be described by showing a wearable apparatus as an example. FIG. 11 is a perspective view showing a structure of a wearable apparatus as an electronic apparatus of a second embodiment.

As shown in FIG. 11, a wearable apparatus 300 as the electronic apparatus of this embodiment is an information apparatus which is worn on, for example, the wrist WR of the human body like a watch and can obtain information associated with the human body, and includes, a band 301, a sensor 302, a display portion 303, a processing portion 304, and a battery 305.

The band 301 is in the form of a belt using a resin having flexibility such as, for example, rubber so as to come into close contact with the wrist WR when it is worn, and has a binding portion capable of adjusting the binding position in an end portion of the band.

The sensor 302 is, for example, an optical sensor, and is placed on the inner face side (the wrist WR side) of the band 301 so as to come into contact with the wrist WR when it is worn.

The display portion 303 is, for example, a light-receiving type liquid crystal display device, and is placed on the outer face side (a side opposite to the inner face on which the sensor 302 is attached) of the band 301 so that a wearer can read the information displayed on the display portion 303.

The processing portion 304 is, for example, an integrated circuit (IC), and is incorporated in the band 301 and is electrically connected to the sensor 302 and the display portion 303. The processing portion 304 performs arithmetic processing for measuring the pulse rate, the blood glucose level, or the like based on the output from the sensor 302. In addition, the processing portion 304 controls the display portion 303 so as to display the measurement result or the like.

The battery 305 is incorporated in the band 301 in an attachable and detachable state as a power supply source which supplies power to the sensor 302, the display portion 303, the processing portion 304, etc. As the battery 305, the lithium battery 100 of the above-mentioned first embodiment is used.

According to the wearable apparatus 300 of this embodiment, by the sensor 302, information or the like associated with the pulse rate or the blood glucose level of a wearer is electrically detected from the wrist WR, and the pulse rate, the blood glucose level, or the like can be displayed on the display portion 303 through the arithmetic processing or the like by the processing portion 304. On the display portion 303, not only the measurement result, but also, for example, information indicating the conditions of the human body predicted from the measurement result, time, etc. can also be displayed.

Since the lithium battery 100 which is small but has an excellent charge-discharge characteristic is used as the battery 305, the wearable apparatus 300 which is lightweight and thin and can withstand long-term repetitive use can be provided. Further, the lithium battery 100 is an all-solid-state secondary battery, and therefore can be repetitively used by charging, and also there is no concern about leakage of the electrolytic solution or the like, and therefore, the wearable apparatus 300 which can be used safely over a long period of time can be provided.

In this embodiment, the wearable apparatus 300 of watch type is shown as an example, however, the wearable apparatus 300 may be a wearable apparatus to be worn on, for example, the ankle, head, ear, waist, or the like.

The electronic apparatus to which the lithium battery 100 is applied as the power supply source is not limited to the wearable apparatus 300. For example, a head-mounted display, a head-up display, a portable telephone, a portable information terminal, a notebook personal computer, a digital camera, a video camera, a music player, a wireless headphone, a gaming machine, and the like can be exemplified. Further, the lithium battery 100 can be applied not only to such consumer apparatuses (apparatuses for general consumers), but also to apparatuses for industrial use. In addition, the electronic apparatuses according to the invention may have another function, for example, a data communication function, a gaming function, a recording and playback function, a dictionary function, or the like.

The invention is not limited to the above-mentioned embodiments, and appropriate modifications are possible without departing from the gist or idea of the invention readable from the appended claims and the entire specification, and an electrolyte precursor solution thus modified, a method for producing an electrode assembly using the electrolyte precursor solution, an electrode assembly, a lithium battery to which the electrode assembly is applied, and an electronic apparatus to which the lithium battery is applied are also included in the technical scope of the invention. Other than the above-mentioned embodiments, various modification examples can be contemplated. Hereinafter, modification examples will be described.

Modification Example 1

The electrode assembly 10 of the above-mentioned first embodiment which functions as a positive electrode includes the active material portion 11, the first electrolyte portion 21, the second electrolyte portion 22, and the third electrolyte portion 23, but may not necessarily include the third electrolyte portion 23.

Modification Example 2

According to the method for producing the lithium battery 100 of the above-mentioned first embodiment, by adjusting the amount of the melt 23m of the third electrolyte 23p to be impregnated into the porous main fired body 10p, the electrolyte layer 24 can be formed simultaneously on the other face 10a of the electrode assembly 10, and therefore, the electrode assembly 10 may include the electrolyte layer 24.

Modification Example 3

Figure 12:
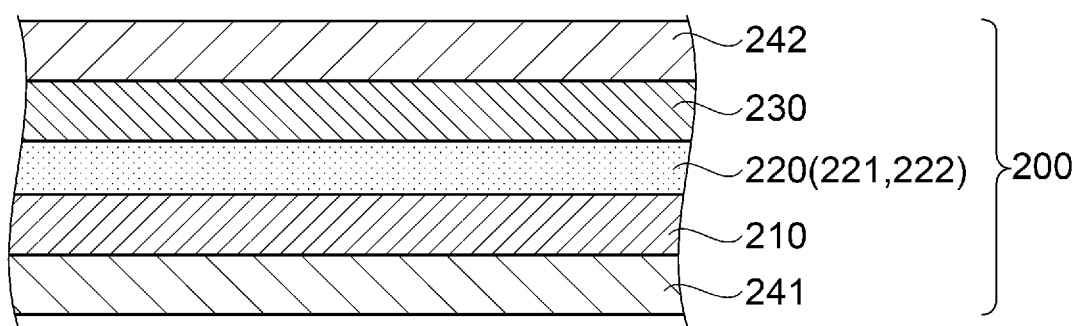
FIG. 12 is a schematic cross-sectional view showing a structure of a lithium battery of a modification example.

The configuration of the lithium battery including the electrolyte formed using the electrolyte precursor solution of the above-mentioned first embodiment is not limited to the lithium battery 100 in which the electrode assembly 10 including the electrolyte 20 in the internal cavities is used as a positive electrode. FIG. 12 is a schematic cross-sectional view showing a structure of a lithium battery of a modification example. A lithium battery 200 of a modification example shown in FIG. 12 is configured such that a positive electrode 210, an electrolyte layer 220, and a negative electrode 230 are sandwiched between a pair of current collectors 241 and 242.

The electrolyte layer 220 includes at least a crystalline first electrolyte portion 221 and an amorphous second electrolyte portion 222, and the first electrolyte portion 221 and the second electrolyte portion 222 can be constituted using the solid electrolytes described in the above-mentioned first embodiment. As a method for forming the electrolyte layer 220, for example, a sheet is formed using a slurry containing a material of the crystalline first electrolyte portion 221 by a green sheet method. The slurry contains a binding agent, a pore forming material, and the like other than the material of the first electrolyte portion 221. Then, an electrolyte precursor solution containing a metallic compound containing elements constituting the second electrolyte portion 222, a solvent capable of dissolving the metallic compound, and an anionic surfactant (for example, LDS) containing a hydrophobic group to which a sulfate group and lithium are bonded is prepared. Impregnation of the calcined sheet with the electrolyte precursor solution, drying, and firing are repeatedly performed, and thereafter, main firing is performed at a temperature of 900° C. or higher and lower than 1000° C. By doing this, the electrolyte layer 220 in the form of a sheet in which the amorphous second electrolyte portion 222 is filled between the particles of the first electrolyte portion 221 in the form of particles, and also lithium sulfate derived from the anionic surfactant (LDS) exists at the interface between the first electrolyte portion 221 in the form of particles and the second electrolyte portion 222 can be formed. By existence of lithium sulfate at the interface between the first electrolyte portion 221 in the form of particles and the second electrolyte portion 222, the dissociation of lithium ions is enhanced, and therefore, the ion conduction property between the crystalline first electrolyte portion 221 and the amorphous second electrolyte portion 222 can be improved.

The positive electrode 210 can be formed by stacking the electrolyte layer 220 in the form of a sheet using the same positive electrode active material as the active material particles 11a constituting the active material portion 11 of the above-mentioned first embodiment by, for example, a green sheet method or the like. The negative electrode 230 can also be formed by stacking on the electrolyte layer 220 in the form of a sheet using the negative electrode active material constituting the negative electrode 30 of the above-mentioned first embodiment by, for example, a green sheet method or the like. When the thus formed stacked body in the form of a sheet in which the positive electrode 210, the electrolyte layer 220, and the negative electrode 230 are stacked is punched into a desired size, a battery cell in the form of a pellet is obtained. For the battery cell, current collectors 241 and 242 may be provided.

Also for the current collectors 241 and 242, for example, one type of metal (metal simple substance) selected from the metal group consisting of copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), and palladium (Pd), an alloy composed of two or more types of metals selected from this metal group, or the like can be used in the same manner as the current collectors 41 and 42 of the above-mentioned first embodiment. Both of the current collectors 241 and 242 are not necessarily essential, and a configuration in which either one is included may be adopted.

According to such a lithium battery 200 and a method for producing the same, an excellent ion conductivity can be realized in the electrolyte layer 220, and therefore, the lithium battery 200 which is thin and also has an excellent battery characteristic and excellent mass productivity can be provided or produced.

The entire disclosure of Japanese Patent Application No. 2017-245964, filed Dec. 22, 2017 is expressly incorporated by reference herein.

What is claimed is:

1. An electrolyte precursor solution, comprising:
a metallic compound containing elements constituting an electrolyte;
a solvent capable of dissolving the metallic compound; and
an anionic surfactant having a sulfate group,
wherein the anionic surfactant is contained at a concentration 5 times or more and 15 times or less a critical micelle concentration in the solvent,
the anionic surfactant contains lithium,
the anionic surfactant contains a hydrophobic group having 4 or more carbon atoms or a fluorinated alkyl group to which a sulfate group and lithium are bonded, and
the metallic compound is represented by the following formula (1) having a garnet-type crystal structure:

$$Li_{7-x}La_3(Zr_{2-x}A_x)O_{12} \qquad (1),$$

where x satisfies the formula: $0.05 \le x \le 0.6$, and A is a metal selected from the group consisting of Nb, Ta, and Sb, and has a crystal radius of 78 pm or more.